US010536956B2

(12) United States Patent
Wang et al.

(10) Patent No.: US 10,536,956 B2
(45) Date of Patent: Jan. 14, 2020

(54) INTERFERENCE MANAGEMENT IN WIRELESS MESH NETWORKS

(71) Applicant: QUALCOMM Incorporated, San Diego, CA (US)

(72) Inventors: Hua Wang, Basking Ridge, NJ (US); Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 15/188,016

(22) Filed: Jun. 21, 2016

(65) Prior Publication Data
US 2017/0367108 A1    Dec. 21, 2017

(51) Int. Cl.
*H04W 72/12* (2009.01)
*H04W 56/00* (2009.01)
*H04W 84/18* (2009.01)

(52) U.S. Cl.
CPC ..... *H04W 72/1231* (2013.01); *H04W 56/001* (2013.01); *H04W 72/1242* (2013.01); *H04W 72/1273* (2013.01); *H04W 84/18* (2013.01)

(58) Field of Classification Search
CPC ......... H04W 72/1231; H04W 72/1242; H04W 72/10; H04W 52/243; H04W 56/001; H04W 72/1273; H04W 72/085; H04W 74/0816; H04W 72/0406; H04W 84/18
See application file for complete search history.

(56) References Cited

U.S. PATENT DOCUMENTS

| 8,599,705 B2 | 12/2013 | Agrawal et al. |
| 8,750,321 B2 | 6/2014 | Roy |
| 2007/0082616 A1 | 4/2007 | Bird |
| (Continued) | | |

FOREIGN PATENT DOCUMENTS

| EP | 1059773 A2 | 12/2000 |
| EP | 2930982 A1 | 10/2015 |

OTHER PUBLICATIONS

ISA/EP, International Search Report and Written Opinion of the International Searching Authority, Int'l Application No. PCT/US2017/032591, dated Sep. 1, 2017, European Patent Office, Rijswijk, NL, 14 pgs.

*Primary Examiner* — Walter J Divito
(74) *Attorney, Agent, or Firm* — Holland & Hart LLP

(57) ABSTRACT

A unified frame structure for communicating in a synchronous and slotted mesh network is provided. Nodes within the mesh network are designated as primary and secondary nodes. For each transmission, a primary node may first send scheduling information to secondary nodes associated with the primary node. The receiver of the scheduled link may send a clear-to-send signal. For uplink scheduled transmissions, the receiver is the primary node. For downlink scheduled transmissions, the receiver is a secondary node. The transmitter of the scheduled link may receive the CTS signal from one or more proximate receivers, including a receiver associated with the scheduled transmission as well as other receivers not associated with the scheduled transmission. The transmitter of the scheduled link may estimate the signal to interference-plus-noise ratio of other links that are of higher priority and may then determine whether to yield or power back off the scheduled transmission.

54 Claims, 22 Drawing Sheets

(56) References Cited

U.S. PATENT DOCUMENTS

| | | | |
|---|---|---|---|
| 2009/0109851 A1 | 4/2009 | Li et al. | |
| 2012/0099587 A1 | 4/2012 | Fan et al. | |
| 2013/0010603 A1* | 1/2013 | Richardson | H04W 74/0875 370/241 |
| 2013/0039289 A1* | 2/2013 | Lee | H04W 52/367 370/329 |
| 2013/0208708 A1* | 8/2013 | Nezou | H04W 74/08 370/336 |
| 2015/0327291 A1 | 11/2015 | Zhou et al. | |

* cited by examiner

INTERFERENCE MANAGEMENT IN WIRELESS MESH NETWORKS

BACKGROUND

Field of the Disclosure

The present disclosure, for example, relates to wireless communication systems, and more specifically to providing interference management.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Because wireless communication uses an open medium, wireless links proximal to each other may cause interference between the wireless links. Hence, interference management is an important aspect in wireless systems, and particularly in wireless mesh networks. A mesh network, for example, may include a network topology in which each node is capable of relaying data for the network. Wireless links in a mesh network are continuously formed, broken, and reformed. The dynamic nature of a mesh network may result in many wireless links that are proximal to each other, leading to potential interference concerns. Improved mesh networking techniques may mitigate interference caused by proximal wireless links.

SUMMARY

The described techniques relate to improved methods, systems, devices, or apparatus that support providing interference management. Generally, the described techniques provide for interference management of multiple wireless links in a wireless mesh network. Wireless communications typically use an open medium. Thus, multiple links in proximity to each other may cause interference during concurrent transmissions. For example, certain types of wireless devices may provide for automated communication in a wireless mesh network (e.g., Machine-to-Machine (M2M) communication). M2M may refer to data communication technologies that allow devices to communicate with one another (e.g., communications from devices that integrate sensors or meters to measure or capture information and relay that information to a central server or application program that can make use of the information).

To mitigate potential sources of interference in a mesh network, a unified frame structure for communicating in a synchronized and slotted mesh network is provided. Nodes within the mesh network may be designated as primary and secondary nodes. For each transmission, a primary node may first send scheduling information to secondary nodes associated with the primary node. Then, the receiver of the scheduled link may send a clear-to-send signal. For uplink (UL) scheduled transmissions, the receiver is the primary node. For downlink (DL) scheduled transmissions, the receiver is a secondary node. The transmitter of the scheduled link may receive clear-to-send signals from one or more proximate receivers, including a receiver associated with the scheduled transmission as well as other receivers not associated with the scheduled transmission. The transmitter of the scheduled link may estimate the signal to interference-plus-noise ratio (SINK) of other links that are of higher priority and may then determine whether to yield or power back off the scheduled transmission.

A method of wireless communication is described. The method may include transmitting, by a first wireless device (e.g., a primary node) DL scheduling information to a second wireless device (e.g., a secondary node) associated with a first wireless link in a wireless network, the DL scheduling information including a first link priority indication associated with the first wireless link, receiving, by the first wireless device, a response signal from a third wireless device (e.g., another primary node or another secondary node) associated with a second wireless link different from the first wireless link, the response signal including a second link priority indication associated with the second wireless link, determining, by the first wireless device, a signal quality metric associated with an impact of a scheduled DL transmission of the first wireless link with respect to the third wireless device, and adjusting the scheduled DL transmission based at least in part on the second link priority indication having a higher priority than the first link priority indication and the signal quality metric exceeding a signal quality threshold.

An apparatus for wireless communication is described. The apparatus may include means for transmitting DL scheduling information to a second wireless device associated with a first wireless link in a wireless network, the DL scheduling information including a first link priority indication associated with the first wireless link, means for receiving a response signal from a third wireless device associated with a second wireless link different from the first wireless link, the response signal including a second link priority indication associated with the second wireless link, means for determining a signal quality metric associated with an impact of a scheduled DL transmission of the first wireless link with respect to the third wireless device, and means for adjusting the scheduled DL transmission based at least in part on the second link priority indication having a higher priority than the first link priority indication and the signal quality metric exceeding a signal quality threshold.

Another apparatus for wireless communication is described. The apparatus may include a processor, memory in electronic communication with the processor, and instructions stored in the memory. The instructions may be operable to cause the processor to transmit DL scheduling information to a second wireless device associated with a first wireless link in a wireless network, the DL scheduling information including a first link priority indication associated with the first wireless link, receive a response signal from a third wireless device associated with a second wireless link different from the first wireless link, the response signal including a second link priority indication associated with the second wireless link, determine a signal quality metric associated with an impact of a scheduled DL transmission of the first wireless link with respect to the third wireless device, and adjust the scheduled DL transmission based at least in part on the second link priority indication having a higher priority than the first link priority indication and the signal quality metric exceeding a signal quality threshold.

A non-transitory computer readable medium for wireless communication is described. The non-transitory computer-readable medium may include instructions operable to cause a processor to transmit DL scheduling information to a second wireless device associated with a first wireless link in a wireless network, the DL scheduling information including a first link priority indication associated with the first wireless link, receive a response signal from a third wireless device associated with a second wireless link different from the first wireless link, the response signal including a second link priority indication associated with the second wireless link, determine a signal quality metric associated with an impact of a scheduled DL transmission of the first wireless link with respect to the third wireless device, and adjust the scheduled DL transmission based at least in part on the second link priority indication having a higher priority than the first link priority indication and the signal quality metric exceeding a signal quality threshold.

Some examples of the method, apparatus, and non-transitory computer-readable medium described above may further include processes, features, means, or instructions for canceling the scheduled DL transmission.

Some examples of the method, apparatus, and non-transitory computer-readable medium described above may further include processes, features, means, or instructions for transmitting the scheduled DL transmission with a transmission power back off Some examples of the method, apparatus, and non-transitory computer-readable medium described above may further include processes, features, means, or instructions for determining the signal quality metric based at least in part on a direct link quality and one or more pilot signals included in the response signal received from the third wireless device.

Some examples of the method, apparatus, and non-transitory computer-readable medium described above may further include processes, features, means, or instructions for establishing the first wireless link between the first wireless device and the second wireless device as a direct point-to-point wireless link.

In some examples of the method, apparatus, and non-transitory computer-readable medium described above, the first wireless link may be established prior to transmitting the DL scheduling information to the second wireless device.

Some examples of the method, apparatus, and non-transitory computer-readable medium described above may further include processes, features, means, or instructions for transmitting the DL scheduling information in a first portion of a frame structure associated with the wireless network.

In some examples of the method, apparatus, and non-transitory computer-readable medium described above, the frame structure comprises a second portion for response signals associated with either DL or UL response transmissions, and a third portion for data signals associated with either DL or UL data transmission.

Some examples of the method, apparatus, and non-transitory computer-readable medium described above may further include processes, features, means, or instructions for transmitting UL scheduling information in the first portion of the frame structure in a frame subsequent to transmitting the DL information, the UL scheduling information including a first clear-to-send message.

Some examples of the method, apparatus, and non-transitory computer-readable medium described above may further include processes, features, means, or instructions for transmitting a supplemental response signal associated with the first wireless link, the supplemental response signal including a second clear-to-send message.

In some examples of the method, apparatus, and non-transitory computer-readable medium described above, the signal quality metric comprises an SINR.

In some examples of the method, apparatus, and non-transitory computer-readable medium described above, the first wireless device may be a primary node in the wireless network and the second wireless device may be a secondary node in the wireless network, primary nodes being configured to transmit scheduling information transmissions in the wireless network and secondary nodes being configured to receive scheduling information transmissions in the wireless network.

A method of wireless communication is described. The method may include receiving, by a second wireless device (e.g., a secondary node), first UL scheduling information from a first wireless device (e.g., a primary node) associated with a first wireless link, the first UL scheduling information including a first link priority indication associated with the first wireless link, receiving, by the second wireless device, a response signal from a third wireless device (e.g., another primary node or another secondary node), the response signal being associated with a second wireless link different from the first wireless link and including a second link priority indication associated with the second wireless link, determining, by the second wireless device, a signal quality metric associated with an impact of a scheduled UL transmission of the first wireless link with respect to the third wireless device, and adjusting, by the second wireless device, the scheduled UL transmission based at least in part on the second link priority indication having a higher priority than the first link priority indication, and the signal quality metric exceeding a signal quality threshold.

An apparatus for wireless communication is described. The apparatus may include means for receiving first UL scheduling information from a first wireless device associated with a first wireless link, the first UL scheduling information including a first link priority indication associated with the first wireless link, means for receiving a response signal from a third wireless device, the response signal being associated with a second wireless link different from the first wireless link and including a second link priority indication associated with the second wireless link, means for determining, by the second wireless device, a signal quality metric associated with an impact of a scheduled UL transmission of the first wireless link with respect to the third wireless device, and means for adjusting, by the second wireless device, the scheduled UL transmission based at least in part on the second link priority indication having a higher priority than the first link priority indication, and the signal quality metric exceeding a signal quality threshold.

Another apparatus for wireless communication is described. The apparatus may include a processor, memory in electronic communication with the processor, and instructions stored in the memory. The instructions may be operable to cause the processor to receive first UL scheduling information from a first wireless device associated with a first wireless link, the first UL scheduling information including a first link priority indication associated with the first wireless link, receive a response signal from a third wireless device, the response signal being associated with a second wireless link different from the first wireless link and including a second link priority indication associated with the second wireless link, determine, by the second wireless device, a signal quality metric associated with an impact of a scheduled UL transmission of the first wireless link with respect to the third wireless device, and adjust, by the second wireless device, the scheduled UL transmission based at least in part on the second link priority indication having a higher priority than the first link priority indication, and the signal quality metric exceeding a signal quality threshold.

A non-transitory computer readable medium for wireless communication is described. The non-transitory computer-readable medium may include instructions operable to cause a processor to receive first UL scheduling information from a first wireless device associated with a first wireless link, the first UL scheduling information including a first link priority indication associated with the first wireless link, receive a response signal from a third wireless device, the response signal being associated with a second wireless link different from the first wireless link and including a second link priority indication associated with the second wireless link, determine, by the second wireless device, a signal quality metric associated with an impact of a scheduled UL transmission of the first wireless link with respect to the third wireless device, and adjust, by the second wireless device, the scheduled UL transmission based at least in part on the second link priority indication having a higher priority than the first link priority indication, and the signal quality metric exceeding a signal quality threshold.

Some examples of the method, apparatus, and non-transitory computer-readable medium described above may further include processes, features, means, or instructions for canceling the scheduled UL transmission responsive to the first UL scheduling information.

Some examples of the method, apparatus, and non-transitory computer-readable medium described above may further include processes, features, means, or instructions for transmitting the scheduled UL transmission with a transmission power back off Some examples of the method, apparatus, and non-transitory computer-readable medium described above may further include processes, features, means, or instructions for receiving the UL scheduling information in a first portion of a frame structure associated with the wireless network.

In some examples of the method, apparatus, and non-transitory computer-readable medium described above, the frame structure comprises a second portion for clear-to-send signals associated with either DL or UL scheduled transmissions, and a third portion for data signals associated with either DL or UL data transmission.

In some examples of the method, apparatus, and non-transitory computer-readable medium described above, the signal quality metric comprises an SINR.

In some examples of the method, apparatus, and non-transitory computer-readable medium described above, the first wireless device may be a primary node in the wireless network and the second wireless device may be a secondary node in the wireless network, primary nodes being configured to transmit scheduling information transmissions in the wireless network and secondary nodes being configured to receive scheduling information transmissions in the wireless network.

A method of wireless communication is described. The method may include receiving, by a second wireless device (e.g., a secondary node), first DL scheduling information from a first wireless device (e.g., a primary node) in the wireless network, the first wireless device and the second wireless device being associated with a first wireless link, receiving, by the second wireless device, second link scheduling information from a third wireless device (e.g., another primary node), the second link scheduling information being associated with a second wireless link different from the first wireless link, and determining, by the second wireless device, whether to transmit a response signal in response to the first DL scheduling information based at least in part on a signal quality metric associated with a scheduled DL transmission of the first wireless link, the signal quality metric being determined from reception of the first DL scheduling information and the second link scheduling information.

An apparatus for wireless communication is described. The apparatus may include means for receiving first DL scheduling information from a first wireless device in the wireless network, the first wireless device and the apparatus being associated with a first wireless link, means for receiving second link scheduling information from a third wireless device, the second link scheduling information being associated with a second wireless link different from the first wireless link, and means for determining whether to transmit a response signal in response to the first DL scheduling information based at least in part on a signal quality metric associated with a scheduled DL transmission of the first wireless link, the signal quality metric being determined from reception of the first DL scheduling information and the second link scheduling information.

Another apparatus for wireless communication is described. The apparatus may include a processor, memory in electronic communication with the processor, and instructions stored in the memory. The instructions may be operable to cause the processor to receive first DL scheduling information from a first wireless device in the wireless network, the first wireless device and the apparatus being associated with a first wireless link, receive second link scheduling information from a third wireless device, the second link scheduling information being associated with a second wireless link different from the first wireless link, and determine whether to transmit a response signal in response to the first DL scheduling information based at least in part on a signal quality metric associated with a scheduled DL transmission of the first wireless link, the signal quality metric being determined from reception of the first DL scheduling information and the second link scheduling information.

A non-transitory computer readable medium for wireless communication is described. The non-transitory computer-readable medium may include instructions operable to cause a processor associated with a second wireless device to receive first DL scheduling information from a first wireless device in the wireless network, the first wireless device and the apparatus being associated with a first wireless link, receive second link scheduling information from a third wireless device, the second link scheduling information being associated with a second wireless link different from the first wireless link, and determine whether to transmit a response signal in response to the first DL scheduling information based at least in part on a signal quality metric associated with a scheduled DL transmission of the first wireless link, the signal quality metric being determined from reception of the first DL scheduling information and the second link scheduling information.

Some examples of the method, apparatus, and non-transitory computer-readable medium described above may further include processes, features, means, or instructions for refraining from transmitting the response signal based on a determination that the signal quality metric may be less than a predetermined threshold.

Some examples of the method, apparatus, and non-transitory computer-readable medium described above may further include processes, features, means, or instructions for transmitting the response signal based on a determination that the signal quality metric may be equal to or greater than a predetermined threshold.

In some examples of the method, apparatus, and non-transitory computer-readable medium described above, the signal quality metric comprises an SINR.

In some examples of the method, apparatus, and non-transitory computer-readable medium described above, the response signal may be a clear-to-send message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
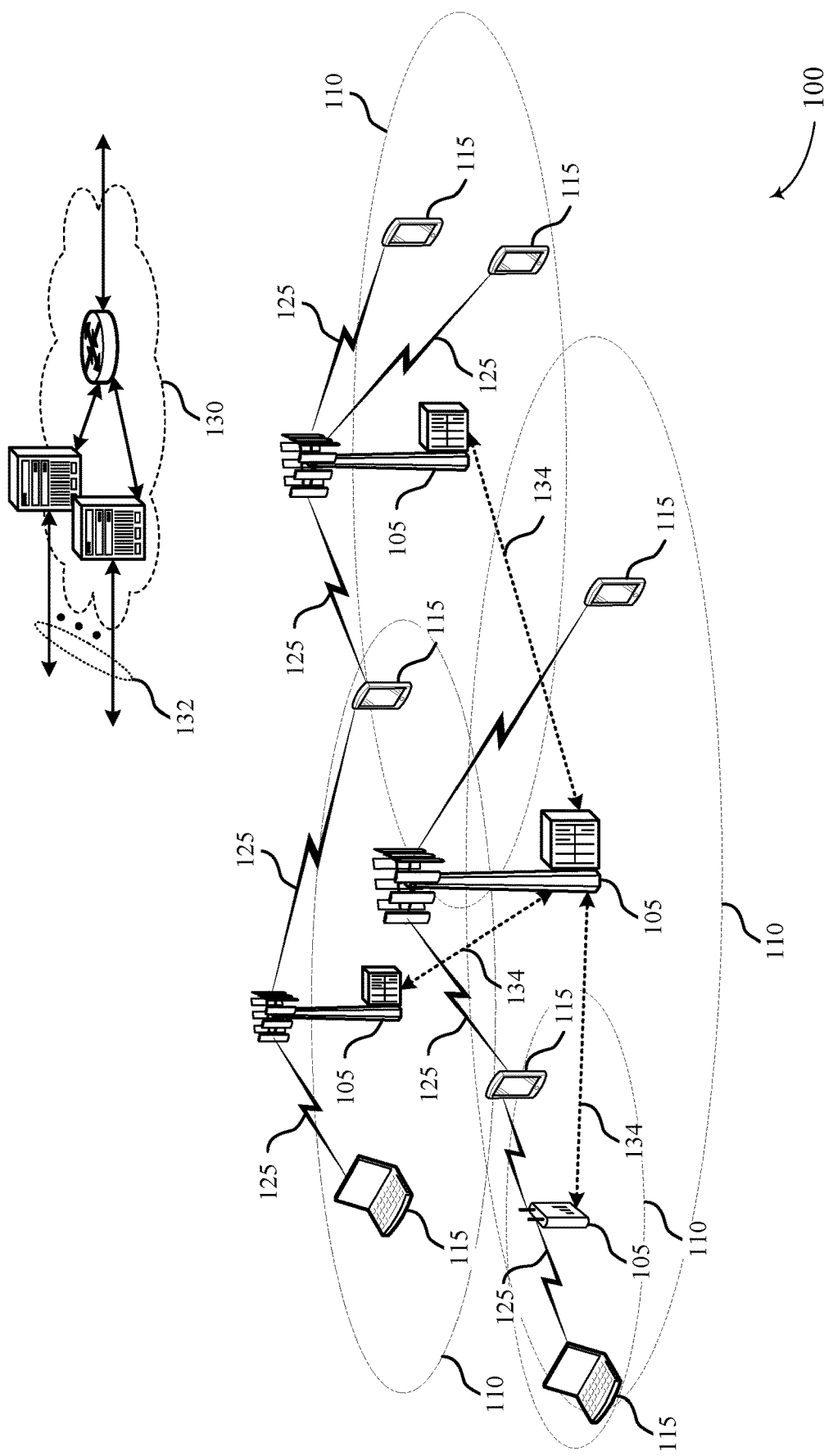
FIG. 1 illustrates an example of a system for wireless communication that supports providing interference management in accordance with aspects of the present disclosure.

Aspects of the present disclosure describe a unified frame structure to manage interference between wireless links in a wireless mesh network. A wireless link includes a primary wireless node and a secondary wireless node in point-to-point wireless communication. Wireless links can be designated with different priorities, and the primary wireless nodes provide scheduling information regarding one or more wireless links between the primary node and one or more secondary nodes. For an uplink (UL) data transmission, the primary wireless node in the wireless mesh network transmits scheduling information to the secondary wireless node that is associated with the scheduled wireless link. Similarly, the primary wireless node also transmits scheduling information to the secondary wireless node for a downlink (DL) data transmission.

The receiver device of the scheduled data transmission is determined based on the scheduling information. In the UL data transmission scenario, the receiver device is the primary wireless node. In the DL data transmission scenario, the receiver device is the secondary wireless node. The receiver device transmits a response signal (e.g., a clear-to-send message). The transmitter device of the scheduled data transmission receives all response signals. For example, in an UL data transmission scenario, the secondary wireless node may receive response signals from the primary node in the scheduled wireless link and response signals from other primary wireless nodes and other secondary wireless nodes proximal to the secondary wireless node that may also be concurrently scheduling UL or DL data transmissions on various wireless links.

The transmitter device of the scheduled data transmission estimates a signal quality metric (e.g., a signal to interference-plus-noise ratio (SINR)) associated with an impact of the scheduled data transmission with respect to the other scheduled data transmissions associated with other wireless links that have a higher priority. Based at least in part on this signal quality metric and wireless link priority information, the transmitter device of the scheduled data transmission, which in the UL data transmission scenario is the secondary wireless node, determines whether to implement a power back off for the secondary wireless node's scheduled UL data transmission or yield to the data transmissions associated with other wireless links and forego the secondary node's scheduled UL data transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Aspects of the disclosure are further illustrated by and described with reference to apparatus diagrams, system diagrams, and flowcharts that relate to providing interference management.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. For example, a wireless mesh network for which the interference management techniques can be implemented may be in wireless communication with one or more base stations 105.

Base stations 105 may wirelessly communicate with UEs 115 via one or more base station antennas. Each base station 105 may provide communication coverage for a respective geographic coverage area 110. Wireless communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine-type communications (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communication links 125 may also be established between UEs 115 in a configuration known as D2D communications. One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

In some cases, a UE 115 (or a base station 105) may be detectable by a central base station 105, but not by other UEs 115 in the coverage area 110 of the central base station 105. For example, one UE 115 may be at one end of the coverage area 110 of the central base station 105 while another UE 115 may be at the other end. Thus, both UEs 115 may communicate with the base station 105, but may not receive the transmissions of the other. This may result in colliding transmissions for the two UEs 115 in a contention based environment (e.g., carrier sense multiple access (CSMA)/ collision avoidance (CA)) because the UEs 115 may not refrain from transmitting on top of each other. A UE 115 whose transmissions are not identifiable, but that is within the same coverage area 110 may be known as a hidden node. CSMA/CA may be supplemented by the exchange of a request-to-send (RTS) packet transmitted by a sending UE 115 (or base station 105) and a clear-to-send (CTS) packet transmitted by the receiving UE 115 (or base station 105). This may alert other devices within range of the sender and receiver not to transmit for the duration of the primary transmission. Thus, RTS/CTS may help mitigate a hidden node problem.

Figure 2:
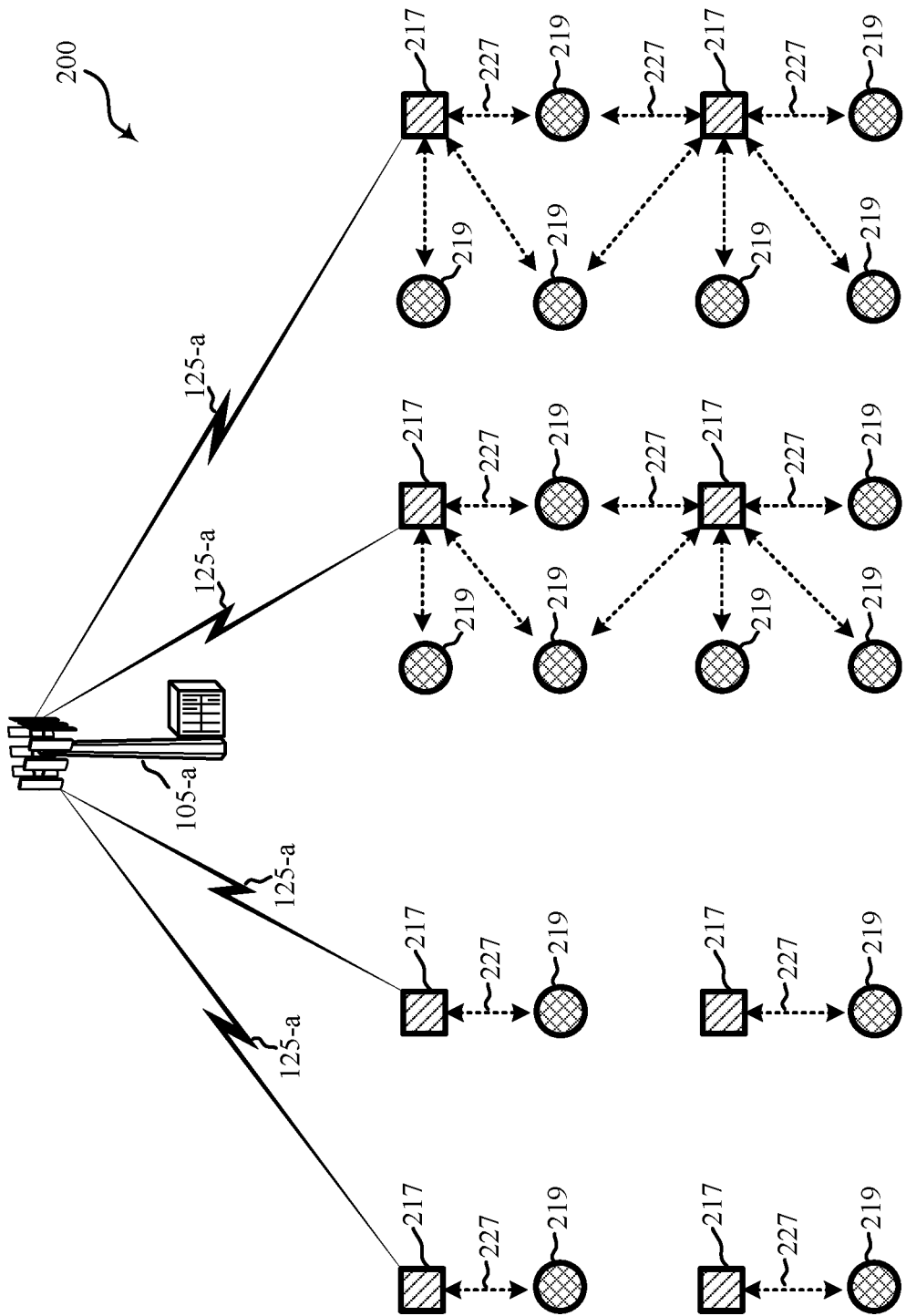
FIG. 2 illustrates an example of synchronous and slotted wireless mesh network that supports providing interference management in accordance with various aspects of the present disclosure.

FIG. 2 illustrates an example of synchronous and slotted wireless mesh network 200 that supports providing interference management in accordance with various aspects of the present disclosure. Wireless mesh network 200 includes a plurality of primary nodes 217 and a plurality of secondary nodes 219. Each primary node 217 may communicate via a wireless communication link 125-a (e.g., via a direct wireless link) with base station 105-a or like device (not illustrated for each primary node 217 in FIG. 2 to avoid obfuscation). Primary nodes 217 and secondary nodes can be UEs 115 as described with respect to FIG. 1, and these nodes may perform synchronized and slotted wireless communication in the wireless mesh network 200.

A primary node 217 may be associated with one or more secondary nodes 219. The primary node 217 may communicate with each of the one or more secondary nodes 219 via a direct point-to-point wireless link 227 (not labeled for each direct point-to-point wireless link 227 in FIG. 2 to avoid obfuscation). In some cases, a secondary node 219 may have multiple direct point-to-point wireless links 227 to different primary nodes 217. The direct point-to-point wireless links 227 are generally bi-directional wireless links, but can be wireless links in a single direction.

Each device in wireless mesh network 200 may be designated as either a primary node 217 or a secondary node 219. For the two nodes of a direct point-to-point wireless link 227, a higher order can be assigned to the primary node 217 (e.g., a Machine-to-Machine (M2M) device that relays information), and a lower order can be assigned to a secondary node 219 (e.g., an M2M sensor device). A primary node 217 may in proximity to other primary nodes 217 (e.g., neighboring nodes), each of which may also be associated with one or more secondary nodes 219. To manage interference between multiple direct point-to-point wireless links 227 in the wireless mesh network 200, primary nodes 217 are designated to transmit scheduling signals associated with the direct point-to-point wireless links 227, and the receiver device for a particular transmission associated with a direct point-to-point wireless link 227 (e.g., either a primary node 217 for an UL transmission or a secondary node 219 for a DL transmission) may transmit a response signal. In some cases, the scheduling signals may provide or serve as request to send messages, and the response signals may provide clear-to-send messages or serve as an indication that a device is "clear to send" a transmission.

In some implementations, a wireless device may be both a primary node 217 and a secondary node 219. For example, a wireless device may move from a first location where the wireless device is a primary node 217 to a second location where the wireless device is a secondary node 219. In some cases, a wireless device may be a secondary node 219 with respect to a first direct point-to-point wireless link 227 associated with a relay device, and that same wireless device can be a primary node 217 with respect to a second direct point-to-point wireless link 227 associated with a sensor device.

Additionally, scheduling transmissions and response signals (e.g., clear-to-send messages) may be transmitted in an orthogonal manner to avoid collisions. In some cases, the orthogonalization of these transmissions may be time division multiplexed, frequency division multiplexed, and/or code division multiplexed. When a direct point-to-point wireless link is established, the primary node 217 and secondary node 219 will generally first listen to scheduling transmissions and response signals of other direct point-to-point wireless links, and then select a scheduling transmission or response signal that is orthogonal with respect to the other scheduling transmissions and response signals.

Figure 3:
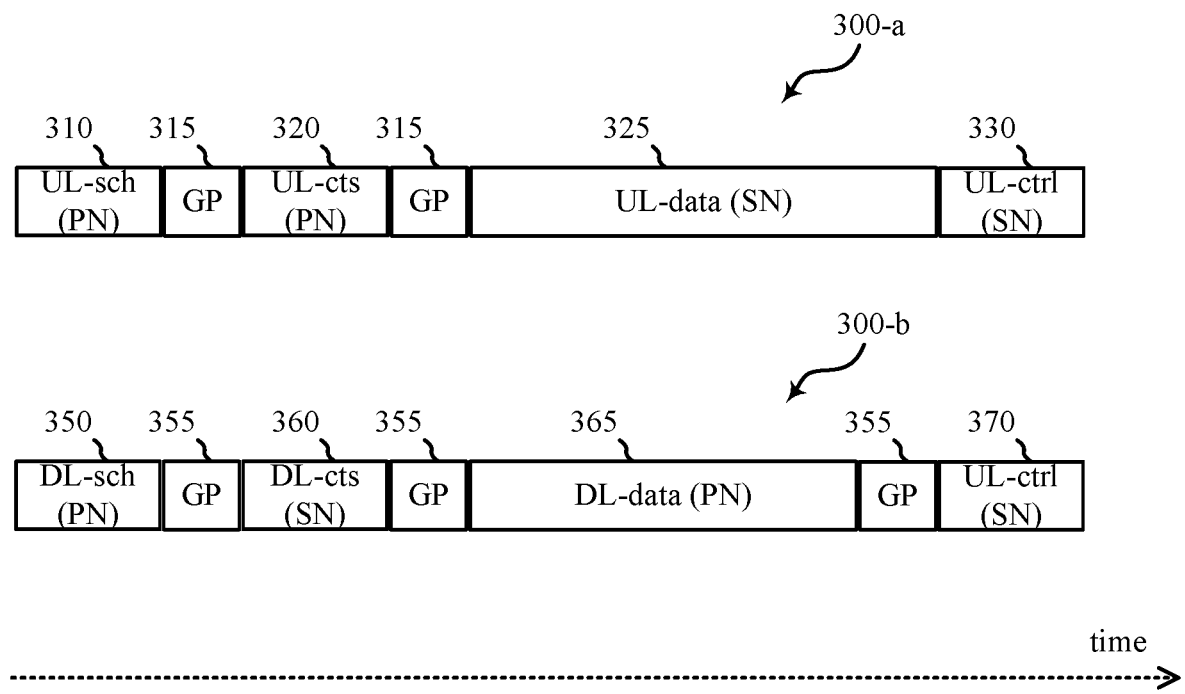
FIG. 3 illustrates an example of a unified frame structure that supports providing interference management in accordance with various aspects of the present disclosure.

FIG. 3 illustrates an example of a unified frame structure that supports providing interference management in accordance with various aspects of the present disclosure. For disclosure. For providing synchronous and time slotted multiple access by a plurality of devices, UL frame structure 300-a may be used by a first device (or node) and a second device (or node), and DL frame structure 300-b may be used by a third device (or node) and a fourth device (or node), simultaneously.

In some examples, UL frame structure 300-a includes a first portion 310 (e.g., first in time) for providing UL scheduling information. A guard band portion 315 may be provided between the first portion 310 and a second portion 320 (e.g., second in time) for providing an UL clear-to-send message. Another guard band portion 315 may be provided between the second portion 320 and a third portion 325 (e.g., third in time) for transmitting UL data. A fourth portion 330 (e.g., forth in time) for providing UL control messages may be provided at an end of UL frame structure 300-a. In UL frame structure 300-a, a guard band portion is not provided between the third portion 325 and the fourth portion 330 as both frame portions correspond to transmissions by a secondary node 219, and a transmitting secondary node 219 and receiving primary node 217 can readily take advantage of the additional time slots for data transmission.

In some examples, DL frame structure 300-b includes a first portion 350 (e.g., first in time) for providing DL scheduling information. A guard band portion 355 may be provided between the first portion 350 and a second portion 360 (e.g., second in time) for providing a DL clear-to-send message. Another guard band portion 355 may be provided between the second portion 360 and a third portion 365 (e.g., third in time) for transmitting DL data. An additional guard band portion 355 may be provided between the third portion 365 and a fourth portion 370 (e.g., forth in time) for providing UL control messages. The fourth portion 370 may be provided at an end of DL frame structure 300-b.

Although data throughput is reduced in DL frame structure 300-b as compared to UL frame structure 300-a, the additional guard band portion 355 is provided between the third portion 365 and the fourth portion 370 because these adjacent frame portions correspond to transmissions by different nodes. In DL frame structure 300-b, the third portion 365 corresponds to a transmission by a primary node 217, while the fourth portion 370 corresponds to a transmission by a secondary node 219.

Figure 4:
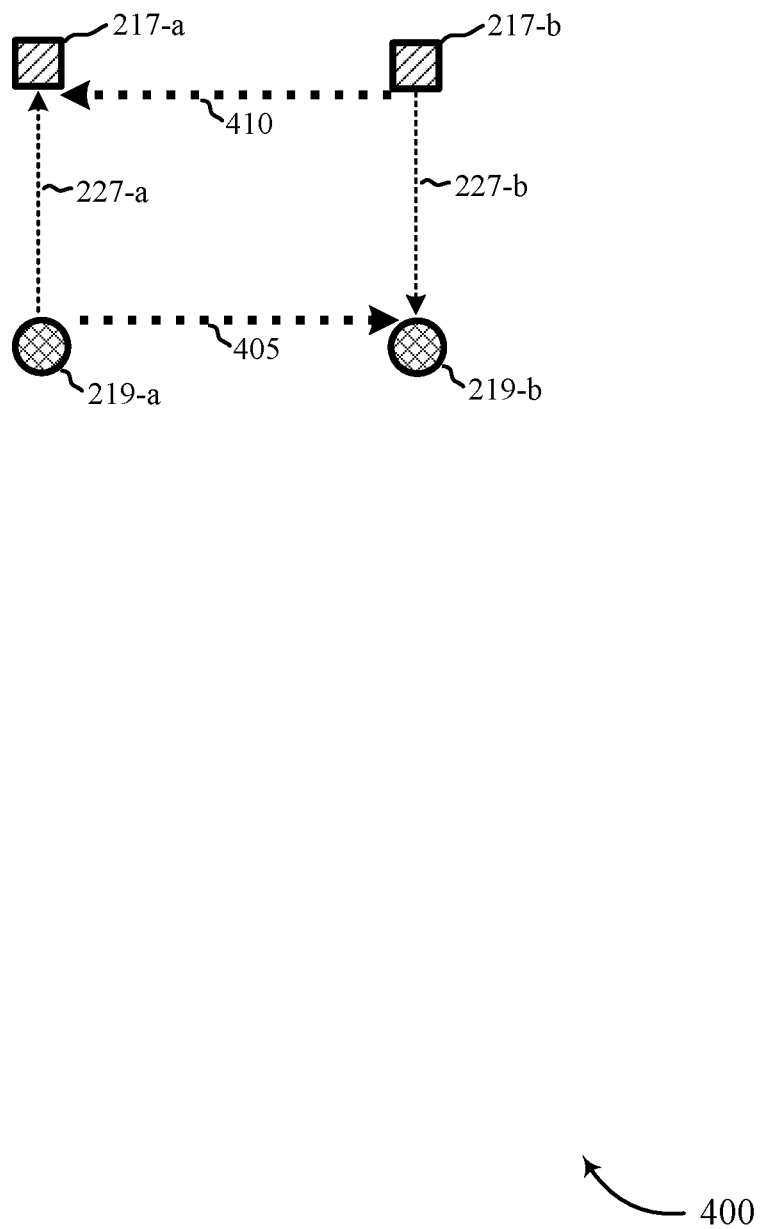
FIG. 4 illustrates an example of an UL-DL interference scenario for which interference management can be provided in accordance with various aspects of the present disclosure.

FIG. 4 illustrates an example of an UL-DL interference scenario 400 for which interference management can be provided in accordance with various aspects of the present disclosure. UL-DL interference scenario 400 will be described with respect to the unified frame structure as described in FIG. 3.

First primary node 217-a may wish to receive UL data from first secondary node 219-a associated with first direct point-to-point wireless link 227-a. A neighboring second primary node 217-b may wish to transmit DL data to second secondary node 219-b associated with second direct point-to-point wireless link 227-b. First, both the first primary node 217-a and the second primary node 217-b transmit scheduling information. First primary node 217-a transmits UL scheduling information during the first portion 310 of UL frame structure 300-a, and second primary node 217-b concurrently transmit DL scheduling information during the first portion 350 of DL frame structure 300-b. The UL scheduling information transmitted by first primary node 217-a includes a priority associated with the first direct point-to-point wireless link 227-a, and DL scheduling information transmitted by second primary node 217-b includes a priority associated with the second direct point-to-point wireless link 227-b.

Based on the UL scheduling information transmitted during first portion 310 of UL frame structure 300-a, first primary node 217-a transmits an UL clear-to-send message during the second portion 320 of UL frame structure 300-a. This UL clear-to-send message can be considered a supplemental or second clear-to-send message as the UL scheduling information (also transmitted by the first primary node 217-a) can be considered as an initial clear-to-send message or indication. In the UL transmission scenario, first primary node 217-a is the receiver of the data transmission associated with first direct point-to-point wireless link 227-a. In response to the DL scheduling information transmitted during first portion 350 of DL frame structure 300-b, second secondary node 219-b transmits a DL clear-to-send message during the second portion 360 of DL frame structure 300-b. In the DL transmission scenario, second secondary node 219-b is the receiver of the data transmission associated with second direct point-to-point wireless link 227-b.

In some examples, the clear-to-send messages transmitted by each of the first primary node 217-a and the second secondary node 219-b includes a link priority of the respective direct point-to-point wireless link and direct link quality (e.g., the direct link quality can be a value that is quantized version of direct link Internet of things (IoT) or signal-to-noise ratio (SNR) value). Additionally, the clear-to-send messages may include one or more pilot signals (or reference signals) so that devices proximal to the first primary node 217-a and the second secondary node 219-b can generate channel estimates upon receiving the clear-to-send messages. For example, the first secondary node 219-a may receive the clear-to-send message transmitted by the first primary node 217-a corresponding to the first direct point-to-point wireless link 227-a, but may also receive the clear-to-send message transmitted by the second secondary node 219-b corresponding to the second direct point-to-point wireless link 227-b (with which the first secondary node 219-a is not associated). Similarly, the second primary node 217-b may receive the clear-to-send message transmitted by the second secondary node 219-*b* corresponding to the second direct point-to-point wireless link 227-*b*, but may also receive the clear-to-send message transmitted by the first primary node 217-*a* corresponding to the first direct point-to-point wireless link 227-*a* (with which the second primary node 217-*b* is not associated).

Consequently, the first secondary node 219-*a* may calculate an estimated interference 405 that the requested and scheduled UL transmission by first secondary node 219-*a* will have on the reception of the requested and scheduled DL transmission to the second secondary node 219-*b* corresponding to the second direct point-to-point wireless link 227-*b*. Similarly, the second primary node 217-*b* may calculate an estimated interference 410 that the requested and scheduled DL transmission by second primary node 217-*b* will have on the reception of the requested and scheduled UL transmission to the first primary node 217-*a* corresponding to the first direct point-to-point wireless link 227-*a*.

Thus, if first secondary node 219-*a* determines that the estimated interference 405 exceeds a predetermined threshold and that the first direct point-to-point wireless link 227-*a* has a lower priority than the second direct point-to-point wireless link 227-*b*, then the first secondary node 219-*a* may perform a transmission adjustment such that the first secondary node 219-*a* reduces transmit power (e.g., perform a transmission power back off) during the third portion 325 of UL frame structure 300-*a* for transmitting UL data, or in some cases cancel the requested and scheduled UL data transmission corresponding to the first direct point-to-point wireless link 227-*a*. Similarly, if second primary node 217-*b* determines that the estimated interference 410 exceeds a predetermined threshold and that the second direct point-to-point wireless link 227-*b* has a lower priority than the first direct point-to-point wireless link 227-*a*, then the second primary node 217-*b* may perform a transmission adjustment such that the second primary node 217-*b* reduces transmit power (e.g., perform a transmission power back off) during the third portion 365 of DL frame structure 300-*b* for transmitting DL data, or in some cases cancel the requested and scheduled DL transmission corresponding to the second direct point-to-point wireless link 227-*b*.

Additionally, first secondary node 219-*a* may transmit UL control information during the fourth portion 330 of UL frame structure 300-*a*, and second secondary node 219-*b* may transmit UL control information during the fourth portion 370 of DL frame structure 300-*b*. The UL control information may include actions taken/noticed by first secondary node 219-*a* or actions taken/noticed by second secondary node 219-*b* during a previous frame or the concurrent frame.

Figure 5:
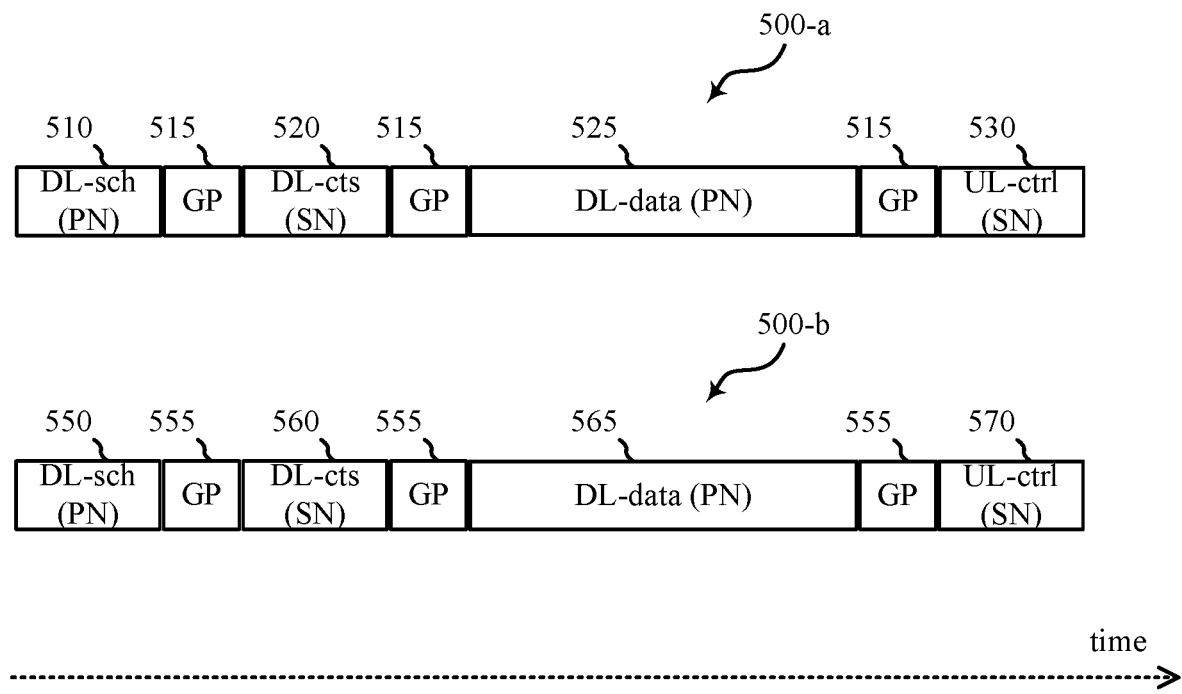
FIG. 5 illustrates an example of a unified frame structure that supports providing interference management in accordance with various aspects of the present disclosure.

FIG. 5 illustrates an example of a unified frame structure that supports providing interference management in accordance with various aspects of the present disclosure. For providing synchronous and time slotted multiple access by a plurality of devices, DL frame structure 500-*a* can be used by a first device (or node) and a second device (or node), and DL frame structure 500-*b* can be used by a third device (or node) and a fourth device (or node), simultaneously.

In some examples, DL frame structure 500-*a* includes a first portion 510 (e.g., first in time) for providing DL scheduling information. A guard band portion 515 may be provided between the first portion 510 and a second portion 520 (e.g., second in time) for providing a DL clear-to-send message. Another guard band portion 515 may be provided between the second portion 520 and a third portion 525 (e.g., third in time) for transmitting DL data. A fourth portion 530 (e.g., fourth in time) for providing UL control messages may be provided at an end of UL frame structure 500-*a*.

In some examples, DL frame structure 500-*b* includes a first portion 550 (e.g., first in time) for providing DL scheduling information. A guard band portion 555 may be provided between the first portion 550 and a second portion 560 (e.g., second in time) for providing a DL clear-to-send message. Another guard band portion 555 may be provided between the second portion 560 and a third portion 565 (e.g., third in time) for transmitting DL data. An additional guard band portion 555 may be provided between the third portion 565 and a fourth portion 570 (e.g., fourth in time) for providing UL control messages. The fourth portion 570 may be provided at an end of DL frame structure 500-*b*.

Figure 6:
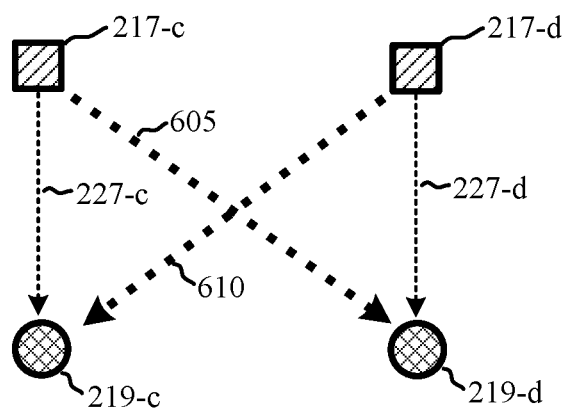
FIG. 6 illustrates an example of a DL-DL interference scenario for which interference management can be provided in accordance with various aspects of the present disclosure.

FIG. 6 illustrates an example of a DL-DL interference scenario 600 for which interference management can be provided in accordance with various aspects of the present disclosure. DL-DL interference scenario 600 will be described with respect to the unified frame structure as described in FIG. 5.

First primary node 217-*c* may wish to transmit DL data to first secondary node 219-*c* associated with first direct point-to-point wireless link 227-*c*. A neighboring second primary node 217-*d* may wish to transmit DL data to second secondary node 219-*d* associated with second direct point-to-point wireless link 227-*d*. First, both the first primary node 217-*c* and the second primary node 217-*d* transmit scheduling information. First primary node 217-*c* transmits DL scheduling information during the first portion 510 of DL frame structure 500-*a*, and second primary node 217-*d* concurrently transmit DL scheduling information during the first portion 550 of DL frame structure 500-*b*. The DL scheduling information transmitted by first primary node 217-*c* includes a priority associated with the first direct point-to-point wireless link 227-*c*, and DL scheduling information transmitted by second primary node 217-*d* includes a priority associated with the second direct point-to-point wireless link 227-*d*.

This DL scheduling information transmitted by first primary node 217-*c* and second primary node 217-*d* can also provide or serve as request to send messages. In response to the DL scheduling information transmitted during first portion 510 of DL frame structure 500-*a* and the first portion 550 of DL frame structure 500-*b*, first secondary node 219-*c* can calculate an SINR based at least in part on the received DL scheduling information (e.g., from both first primary node 217-*c* and second primary node 217-*d*). Thus, if the calculated SINR is below a predefined threshold, the first secondary node 219-*c* may refrain from responding and not transmit a response signal or clear-to-send message (and thereby indicating to the first primary node 217-*c* not to transmit DL data during the third portion 525 of the of DL frame structure 500-*b*). The first secondary node 219-*c* may refrain from responding particularly when the priority associated with the first direct point-to-point wireless link 227-*c* has a low priority with respect to other direct point-to-point wireless link links proximal to the first secondary node 219-*c*.

If, however, the calculated SINR is above a predefined threshold such that the first direct point-to-point wireless link 227-*c* can achieve a targeted communication rate, then the first secondary node 219-*c* may send a response signal (e.g., a DL clear-to-send message) back to first primary node 217-*c* during the second portion 520 of DL frame structure 500-*a*. In the DL transmission scenario, first secondary node 219-*c* is the receiver of the data transmission associated with first direct point-to-point wireless link 227-*c*. In response to the DL scheduling information transmitted during first portion 510 of DL frame structure 500-*a* and the first portion 550 of DL frame structure 500-*b*, second secondary node 219-*d* calculate a received SINR, and may refrain from responding or transmits a DL clear-to-send message during the second portion 560 of DL frame structure 500-*b* as dissed above with respect to the first secondary node 219-*c*. In the DL transmission scenario, second secondary node 219-*d* is the receiver of the data transmission associated with second direct point-to-point wireless link 227-*d*.

In some examples, the clear-to-send messages transmitted by each of the first secondary node 219-*c* and the second secondary node 219-*d* includes a link priority of the respective direct point-to-point wireless link and direct link quality (e.g., the direct link quality can be a value that is quantized version of direct link IoT or SNR value). Additionally, the clear-to-send messages may include one or more pilot signals (or reference signals) so that devices proximal to the first secondary node 219-*c* and the second secondary node 219-*d* can generate channel estimates upon receiving the clear-to-send messages. For example, the first primary node 217-*c* may receive the clear-to-send message transmitted by the first secondary node 219-*c* corresponding to the first direct point-to-point wireless link 227-*c*, but may also receive the clear-to-send message transmitted by the second secondary node 219-*d* corresponding to the second direct point-to-point wireless link 227-*d* (with which the first primary node 217-*c* is not associated). Similarly, the second primary node 217-*d* may receive the clear-to-send message transmitted by the second secondary node 219-*d* corresponding to the second direct point-to-point wireless link 227-*d*, but may also receive the clear-to-send message transmitted by the first secondary node 219-*c* corresponding to the first direct point-to-point wireless link 227-*c* (with which the second primary node 217-*d* is not associated).

Consequently, the first primary node 217-*c* can calculate an estimated interference 605 that the requested and scheduled DL transmission by first primary node 217-*c* will have on the reception of the requested and scheduled DL transmission to the second secondary node 219-*d* corresponding to the second direct point-to-point wireless link 227-*d*. Similarly, the second primary node 217-*d* can calculate an estimated interference 610 that the requested and scheduled DL transmission by second primary node 217-*d* will have on the reception of the requested and scheduled DL transmission to the first secondary node 219-*c* corresponding to the first direct point-to-point wireless link 227-*c*.

Thus, if first primary node 217-*c* determines that the estimated interference 605 exceeds a predetermined threshold and that the first direct point-to-point wireless link 227-*c* has a lower priority than the second direct point-to-point wireless link 227-*d*, then the first primary node 217-*c* may perform a transmission adjustment such that the first primary node 217-*c* reduces transmit power (e.g., perform a transmission power back off) during the third portion 525 of DL frame structure 500-*a* for transmitting DL data, or in some cases cancel the requested and scheduled DL data transmission corresponding to the first direct point-to-point wireless link 227-*c*. Similarly, if second primary node 217-*d* determines that the estimated interference 610 exceeds a predetermined threshold and that the second direct point-to-point wireless link 227-*d* has a lower priority than the first direct point-to-point wireless link 227-*c*, then the second primary node 217-*d* may perform a transmission adjustment such that the second primary node 217-*c* reduces transmit power (e.g., perform a transmission power back off) during the third portion 565 of DL frame structure 500-*b* for transmitting DL data, or in some cases cancel the requested and scheduled DL transmission corresponding to the second direct point-to-point wireless link 227-*d*.

Additionally, first secondary node 219-*c* may transmit UL control information during the fourth portion 530 of UL frame structure 500-*a*, and second secondary node 219-*d* may transmit UL control information during the fourth portion 570 of DL frame structure 500-*b*. The UL control information may include actions taken/noticed by first secondary node 219-*c* or actions taken/noticed by second secondary node 219-*d* during a previous frame or the concurrent frame.

Figure 7:
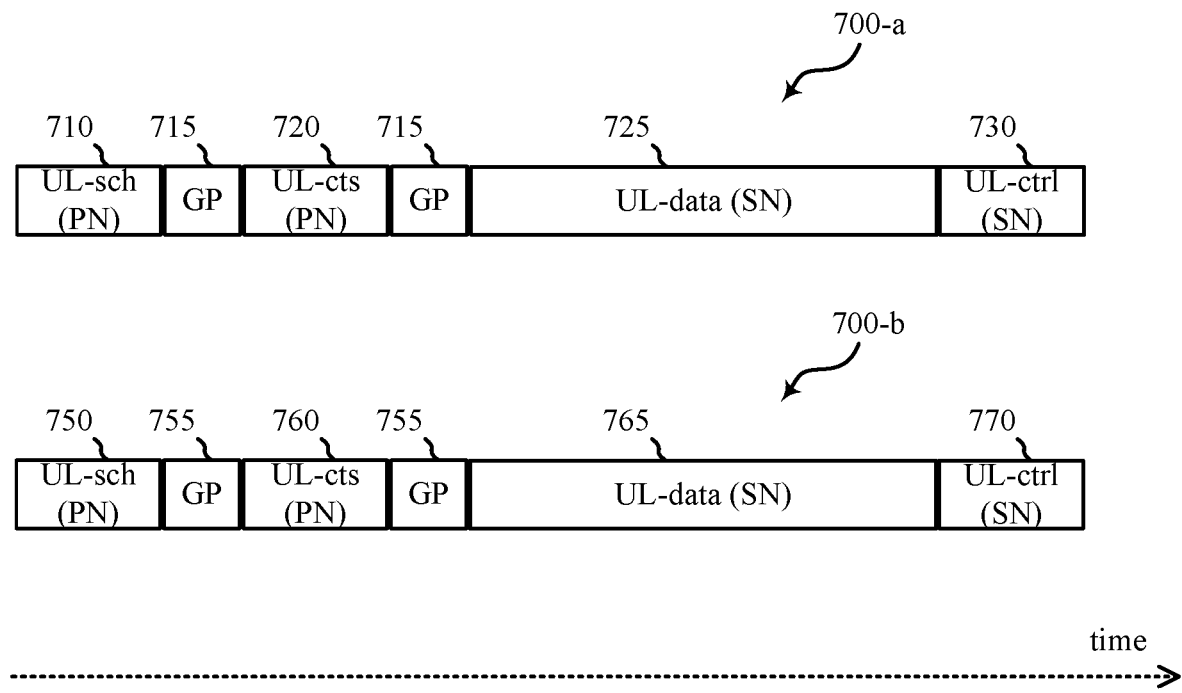
FIG. 7 illustrates an example of a unified frame structure that supports providing interference management in accordance with various aspects of the present disclosure.

FIG. 7 illustrates an example of a unified frame structure that supports providing interference management in accordance with various aspects of the present disclosure. For providing synchronous and time slotted multiple access by a plurality of devices, DL frame structure 700-*a* can be used by a first device (or node) and a second device (or node), and DL frame structure 700-*b* can be used by a third device (or node) and a fourth device (or node), simultaneously.

In some examples, DL frame structure 700-*a* includes a first portion 710 (e.g., first in time) for providing UL scheduling information. A guard band portion 715 may be provided between the first portion 710 and a second portion 720 (e.g., second in time) for providing a UL clear-to-send message. Another guard band portion 715 may be provided between the second portion 720 and a third portion 725 (e.g., third in time) for transmitting UL data. A fourth portion 730 (e.g., fourth in time) for providing UL control messages may be provided at an end of UL frame structure 700-*a*.

In some examples, UL frame structure 700-*b* includes a first portion 750 (e.g., first in time) for providing UL scheduling information. A guard band portion 755 may be provided between the first portion 750 and a second portion 760 (e.g., second in time) for providing a UL clear-to-send message. Another guard band portion 755 may be provided between the second portion 760 and a third portion 765 (e.g., third in time) for transmitting UL data. A fourth portion 770 (e.g., fourth in time) for providing UL control messages may be provided at an end of UL frame structure 700-*b*.

Figure 8:
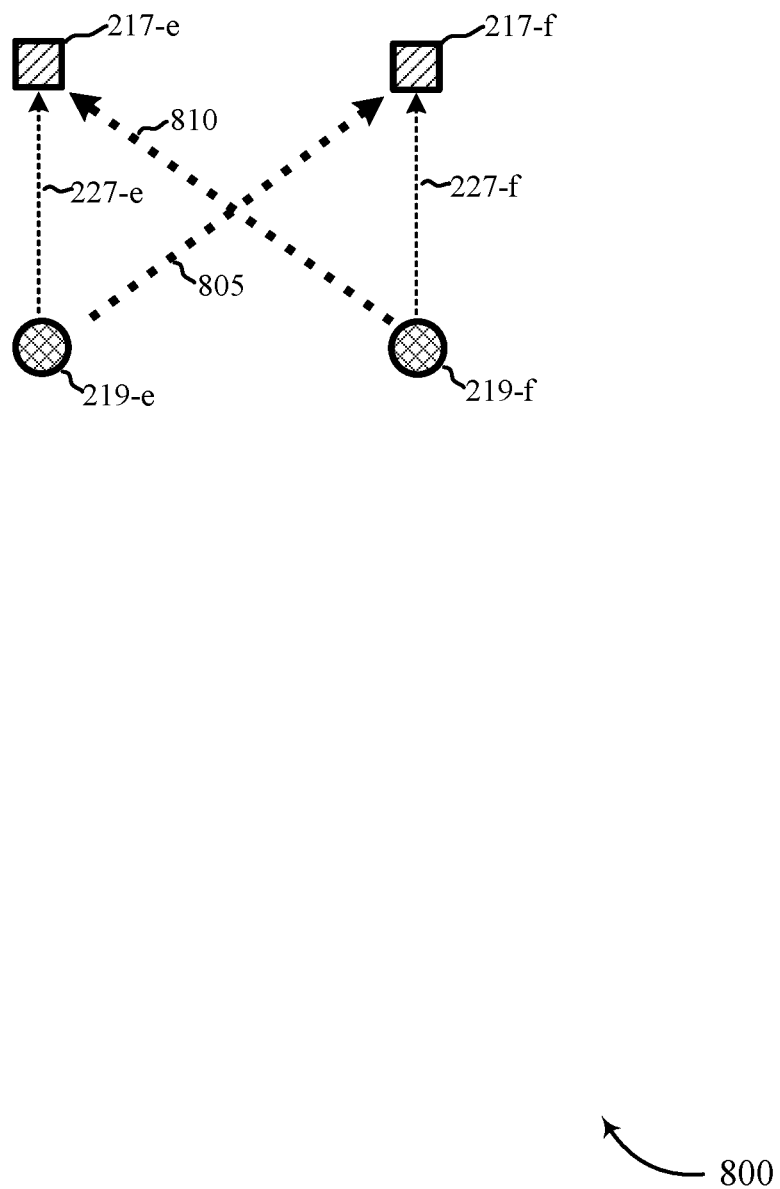
FIG. 8 illustrates an example of an UL-UL interference scenario for which interference management can be provided in accordance with various aspects of the present disclosure.

FIG. 8 illustrates an example of an UL-UL interference scenario 800 for which interference management can be provided in accordance with various aspects of the present disclosure. UL-UL interference scenario 800 will be described with respect to the unified frame structure as described in FIG. 7.

First primary node 217-*e* may wish to receive UL data from first secondary node 219-*e* associated with first direct point-to-point wireless link 227-*e*. A neighboring second primary node 217-*f* may wish to receive UL data from second secondary node 219-*f* associated with second direct point-to-point wireless link 227-*f* First, both the first primary node 217-*e* and the second primary node 217-*f* transmit scheduling information. First primary node 217-*e* transmits UL scheduling information during the first portion 710 of UL frame structure 700-*a*, and second primary node 217-*f* concurrently transmit UL scheduling information during the first portion 750 of UL frame structure 700-*b*. The UL scheduling information transmitted by first primary node 217-*e* includes a priority associated with the first direct point-to-point wireless link 227-*e*, and UL scheduling information transmitted by second primary node 217-*f* includes a priority associated with the second direct point-to-point wireless link 227-*f*. The UL scheduling information transmitted by first primary node 217-*e* and second primary node 217-*f* provide or serve as UL clear-to-send messages.

Based on the UL scheduling information transmitted during first portion 710 of UL frame structure 700-*a*, first primary node 217-*e* transmits a supplemental or second UL clear-to-send message during the second portion 720 of UL frame structure 700-*a* because first primary node 217-*e* does not know at this time whether neighboring second primary node 217-*f* is also planning an UL data transmission. In the UL transmission scenario, first primary node 217-*e* is the receiver of the data transmission associated with first direct point-to-point wireless link 227-*e*. Based on the UL scheduling information transmitted during first portion 750 of UL frame structure 700-*b*, second primary node 217-*f* transmits a UL clear-to-send message during the second portion 760 of UL frame structure 700-*b*. This UL clear-to-send message can be considered a supplemental or second clear-to-send message as the UL scheduling information (also transmitted by the second primary node 217-*f*) can be considered as an initial clear-to-send message or indication. In the UL transmission scenario, second primary node 217-*f* is the receiver of the data transmission associated with second direct point-to-point wireless link 227-*f*.

In some examples, the clear-to-send messages transmitted by each of the first primary node 217-*e* and the second primary node 217-*f* includes a link priority of the respective direct point-to-point wireless link and direct link quality (e.g., the direct link quality can be a value that is quantized version of direct link IoT or SNR value). Additionally, the clear-to-send messages may include one or more pilot signals (or reference signals) so that devices proximal to the first primary node 217-*e* and the second primary node 217-*f* can generate channel estimates upon receiving the clear-to-send messages. For example, the first secondary node 219-*e* may receive the clear-to-send message transmitted by the first primary node 217-*e* corresponding to the first direct point-to-point wireless link 227-*e*, but may also receive the clear-to-send message transmitted by the second primary node 217-*f* corresponding to the second direct point-to-point wireless link 227-*f* (with which the first secondary node 219-*e* is not associated). Similarly, the second secondary node 219-*f* may receive the clear-to-send message transmitted by the second primary node 217-*f* corresponding to the second direct point-to-point wireless link 227-*f*, but may also receive the clear-to-send message transmitted by the first primary node 217-*e* corresponding to the first direct point-to-point wireless link 227-*e* (with which the second secondary node 219-*f* is not associated).

Consequently, the first secondary node 219-*e* can calculate an estimated interference 805 that the requested and scheduled UL transmission by first secondary node 219-*e* will have on the reception of the requested and scheduled UL transmission to the second primary node 217-*f* corresponding to the second direct point-to-point wireless link 227-*f*. Similarly, the second secondary node 219-*f* can calculate an estimated interference 810 that the requested and scheduled UL transmission by second secondary node 219-*f* will have on the reception of the requested and scheduled UL transmission to the first primary node 217-*e* corresponding to the first direct point-to-point wireless link 227-*e*.

Thus, if first secondary node 219-*e* determines that the estimated interference 805 exceeds a predetermined threshold and that the first direct point-to-point wireless link 227-*e* has a lower priority than the second direct point-to-point wireless link 227-*f*, then the first secondary node 219-*e* may perform a transmission adjustment such that the first secondary node 219-*e* reduces transmit power (e.g., perform a transmission power back off) during the third portion 725 of UL frame structure 700-*a* for transmitting UL data, or in some cases cancel the requested and scheduled UL data transmission corresponding to the first direct point-to-point wireless link 227-*e*. Similarly, if second secondary node 219-*f* determines that the estimated interference 810 exceeds a predetermined threshold and that the second direct point-to-point wireless link 227-*f* has a lower priority than the first direct point-to-point wireless link 227-*e*, then the second secondary node 219-*f* may perform a transmission adjustment such that the second secondary node 219-*e* reduces transmit power (e.g., perform a transmission power back off) during the third portion 765 of UL frame structure 700-*b* for transmitting UL data, or in some cases cancel the requested and scheduled UL transmission corresponding to the second direct point-to-point wireless link 227-*d*.

Additionally, first secondary node 219-*e* may transmit UL control information during the fourth portion 730 of UL frame structure 700-*a*, and second secondary node 219-*f* may transmit UL control information during the fourth portion 770 of DL frame structure 700-*b*. The UL control information may include actions taken/noticed by first secondary node 219-*e* or actions taken/noticed by second secondary node 219-*f* during a previous frame or the concurrent frame.

Figure 9:
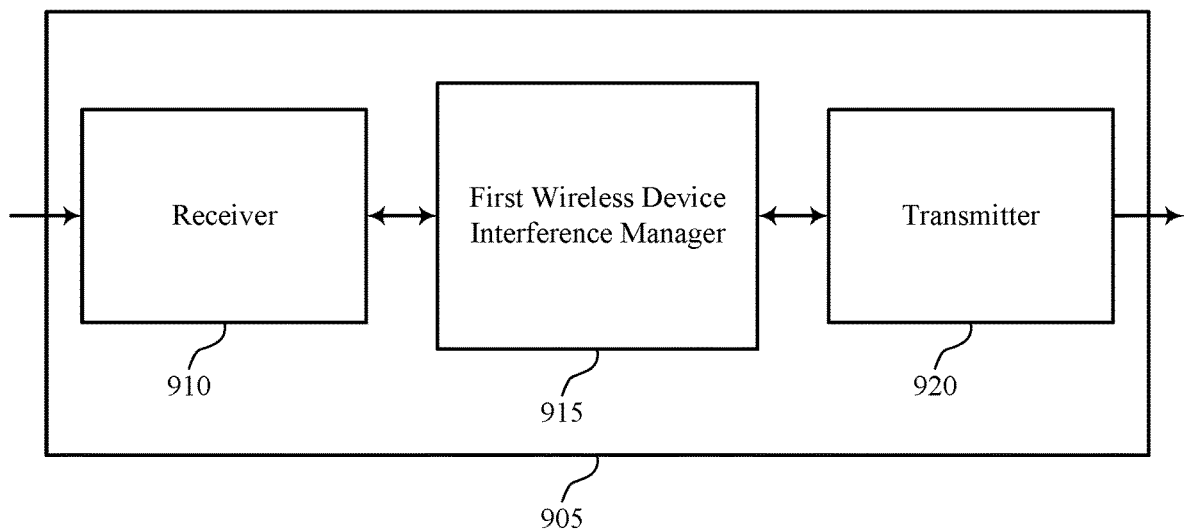
FIGS. 9 through 11 show block diagrams of a device that supports providing interference management in accordance with aspects of the present disclosure.

FIG. 9 shows a block diagram 900 of a wireless device 905 that supports providing interference management in accordance with various aspects of the present disclosure. Wireless device 905 may be an example of aspects of a first wireless device (e.g., a primary node 217) as described with reference to FIGS. 1-8. Wireless device 905 may include receiver 910, first wireless device interference manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to providing interference management, etc.). Information may be passed on to other components of the device. The receiver 910 may be an example of aspects of the transceiver 1235 described with reference to FIG. 12.

First wireless device interference manager 915 may be an example of aspects of the first wireless device interference manager 1215 described with reference to FIG. 12.

First wireless device interference manager 915 may transmit DL scheduling information to a second wireless device associated with a first wireless link in a wireless network, the DL scheduling information including a first link priority indication associated with the first wireless link, receive a response signal from a third wireless device associated with a second wireless link different from the first wireless link, the response signal including a second link priority indication associated with the second wireless link, determine a signal quality metric associated with an impact of a scheduled DL transmission of the first wireless link with respect to the third wireless device, and adjust the scheduled DL transmission based on the second link priority indication having a higher priority than the first link priority indication and the signal quality metric exceeding a signal quality threshold.

The first wireless device interference manager 915 may also establish the first wireless link between the first wireless device and the second wireless device as a direct point-to-point wireless link, where the first wireless link is established prior to transmitting the DL scheduling information to the second wireless device, transmit DL scheduling information to a second wireless device associated with a first wireless link in a wireless network, the DL scheduling information including a first link priority indication associated with the first wireless link, where transmitting the DL scheduling information includes transmitting the DL scheduling information in a first portion of a frame structure associated with the wireless network, where the frame structure includes a second portion for response signals associated with either DL or UL response transmissions, and a third portion for data signals associated with either DL or UL data transmission, receive a response signal from a third wireless device associated with a second wireless link different from the first wireless link, the response signal including a second link priority indication associated with the second wireless link, where receiving the UL scheduling information includes receiving the UL scheduling information in a first portion of a frame structure associated with the wireless network, determine a signal quality metric associated with an impact of a scheduled DL transmission of the first wireless link with respect to the third wireless device, where determining the signal quality metric includes determining the signal quality metric based on a direct link quality and one or more pilot signals included in the response signal received from the third wireless device, where the signal quality metric includes an SINK, adjust the scheduled DL transmission based on the second link priority indication having a higher priority than the first link priority indication and the signal quality metric exceeding a signal quality threshold, where adjusting the scheduled UL transmission includes canceling the scheduled UL transmission responsive to the first UL scheduling information or transmitting the scheduled DL transmission with a transmission power back off, transmit UL scheduling information in the first portion of the frame structure in a frame subsequent to transmitting the DL information, the UL scheduling information including a first clear-to-send message, and transmit a supplemental response signal associated with the first wireless link, the supplemental response signal including a second clear-to-send message.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
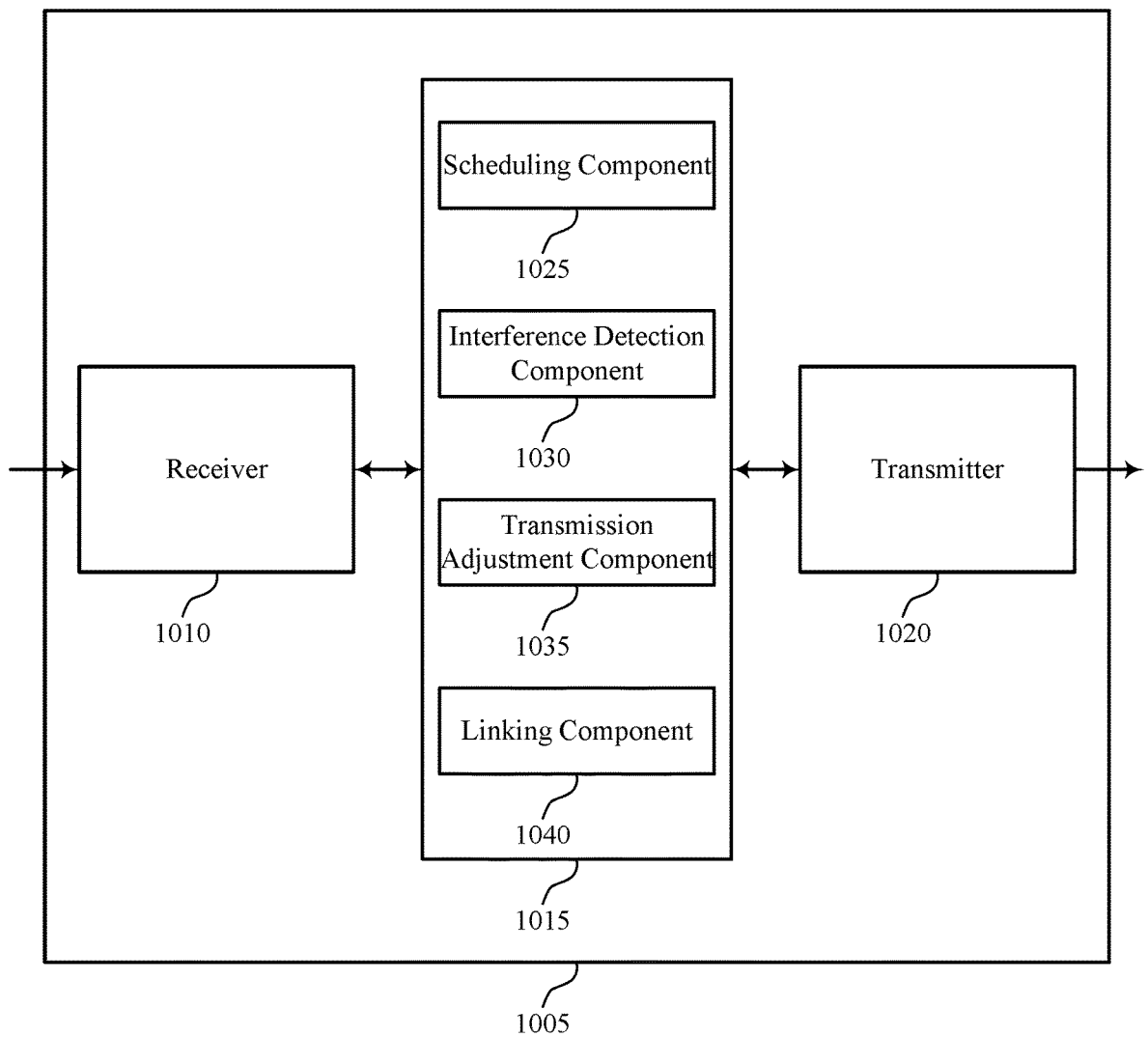

FIG. 10 shows a block diagram 1000 of a wireless device 1005 that supports providing interference management in accordance with various aspects of the present disclosure. Wireless device 1005 may be an example of aspects of a wireless device 905 or a first wireless device (e.g., a primary node 217) as described with reference to FIGS. 1-9. Wireless device 1005 may include receiver 1010, first wireless device interference manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to providing interference management, etc.). Information may be passed on to other components of the device. The receiver 1010 may be an example of aspects of the transceiver 1235 described with reference to FIG. 12.

First wireless device interference manager 1015 may be an example of aspects of the first wireless device interference manager 1215 described with reference to FIG. 12.

First wireless device interference manager 1015 may also include scheduling component 1025, interference detection component 1030, transmission adjustment component 1035, and linking component 1040.

Scheduling component 1025 may transmit DL scheduling information to a second wireless device associated with a first wireless link in a wireless network, the DL scheduling information including a first link priority indication associated with the first wireless link, transmit the DL scheduling information in a first portion of a frame structure associated with the wireless network, transmit UL scheduling information in the first portion of the frame structure in a frame subsequent to transmitting the DL information, the UL scheduling information including a first clear-to-send message, transmit a supplemental response signal associated with the first wireless link, the supplemental response signal including a second clear-to-send message, and transmit DL scheduling information to a second wireless device associated with a first wireless link in a wireless network, the DL scheduling information including a first link priority indication associated with the first wireless link, where transmitting the DL scheduling information includes transmitting the DL scheduling information in a first portion of a frame structure associated with the wireless network, where the frame structure includes a second portion for response signals associated with either DL or UL response transmissions, and a third portion for data signals associated with either DL or UL data transmission. In some cases, the frame structure includes a second portion for response signals associated with either DL or UL response transmissions, and a third portion for data signals associated with either DL or UL data transmission. In some cases, the first wireless device is a primary node in the wireless network and the second wireless device is a secondary node in the wireless network, primary nodes being configured to transmit scheduling information transmissions in the wireless network and secondary nodes being configured to receive scheduling information transmissions in the wireless network.

Interference detection component 1030 may receive a response signal from a third wireless device associated with a second wireless link different from the first wireless link, the response signal including a second link priority indication associated with the second wireless link, determine a signal quality metric associated with an impact of a scheduled DL transmission of the first wireless link with respect to the third wireless device, receive a response signal from a third wireless device associated with a second wireless link different from the first wireless link, the response signal including a second link priority indication associated with the second wireless link, where receiving the UL scheduling information includes receiving the UL scheduling information in a first portion of a frame structure associated with the wireless network, and determine a signal quality metric associated with an impact of a scheduled DL transmission of the first wireless link with respect to the third wireless device, where determining the signal quality metric includes determining the signal quality metric based on a direct link quality and one or more pilot signals included in the response signal received from the third wireless device, where the signal quality metric includes an SINR. In some cases, the signal quality metric includes an SINR.

Transmission adjustment component 1035 may cancel the scheduled DL transmission, adjust the scheduled DL transmission based on the second link priority indication having a higher priority than the first link priority indication and the signal quality metric exceeding a signal quality threshold, transmit the scheduled DL transmission with a transmission power back off, determine the signal quality metric based on a direct link quality and one or more pilot signals included in the response signal received from the third wireless device, and adjust the scheduled DL transmission based on the second link priority indication having a higher priority than the first link priority indication and the signal quality metric exceeding a signal quality threshold, where adjusting the scheduled UL transmission includes canceling the scheduled UL transmission responsive to the first UL scheduling information or transmitting the scheduled DL transmission with a transmission power back off.

Linking component 1040 may establish the first wireless link between the first wireless device and the second wireless device as a direct point-to-point wireless link and establish the first wireless link between the first wireless device and the second wireless device as a direct point-to-point wireless link, where the first wireless link is established prior to transmitting the DL scheduling information to the second wireless device. In some cases, the first wireless link is established prior to transmitting the DL scheduling information to the second wireless device.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
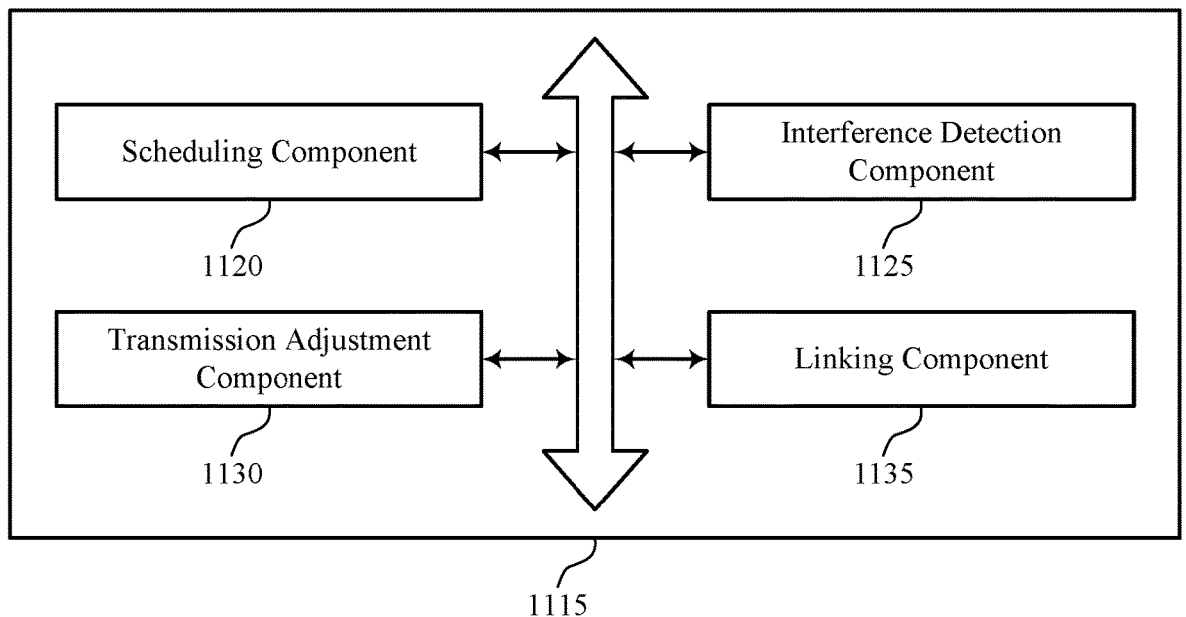

FIG. 11 shows a block diagram 1100 of a first wireless device interference manager 1115 that supports providing interference management in accordance with various aspects of the present disclosure. The first wireless device interference manager 1115 may be an example of aspects of a first wireless device interference manager 915, a first wireless device interference manager 1015, or a first wireless device interference manager 1215 described with reference to FIGS. 9, 10, and 12. The first wireless device interference manager 1115 may include scheduling component 1120, interference detection component 1125, transmission adjustment component 1130, and linking component 1135. Each of these modules may communicate, directly or indirectly, with one another (e.g., via one or more buses).

Scheduling component 1120 may transmit DL scheduling information to a second wireless device associated with a first wireless link in a wireless network, the DL scheduling information including a first link priority indication associated with the first wireless link, transmit the DL scheduling information in a first portion of a frame structure associated with the wireless network, transmit UL scheduling information in the first portion of the frame structure in a frame subsequent to transmitting the DL information, the UL scheduling information including a first clear-to-send message, transmit a response signal associated with the first wireless link, the response signal including a second clear-to-send message, and transmit DL scheduling information to a second wireless device associated with a first wireless link in a wireless network, the DL scheduling information including a first link priority indication associated with the first wireless link, where transmitting the DL scheduling information includes transmitting the DL scheduling information in a first portion of a frame structure associated with the wireless network, where the frame structure includes a second portion for response signals associated with either DL or UL response transmissions, and a third portion for data signals associated with either DL or UL data transmission. In some cases, the frame structure includes a second portion for response signals associated with either DL or UL response transmissions, and a third portion for data signals associated with either DL or UL data transmission. In some cases, the first wireless device is a primary node in the wireless network and the second wireless device is a secondary node in the wireless network, primary nodes being configured to transmit scheduling information transmissions in the wireless network and secondary nodes being configured to receive scheduling information transmissions in the wireless network.

Interference detection component 1125 may receive a response signal from a third wireless device associated with a second wireless link different from the first wireless link, the response signal including a second link priority indication associated with the second wireless link, determine a signal quality metric associated with an impact of a scheduled DL transmission of the first wireless link with respect to the third wireless device, receive a response signal from a third wireless device associated with a second wireless link different from the first wireless link, the response signal including a second link priority indication associated with the second wireless link, where receiving the UL scheduling information includes receiving the UL scheduling information in a first portion of a frame structure associated with the wireless network, and determine a signal quality metric associated with an impact of a scheduled DL transmission of the first wireless link with respect to the third wireless device, where determining the signal quality metric includes determining the signal quality metric based on a direct link quality and one or more pilot signals included in the response signal received from the third wireless device, where the signal quality metric includes an SINR. In some cases, the signal quality metric includes an SINR.

Transmission adjustment component 1130 may cancel the scheduled DL transmission, adjust the scheduled DL transmission based on the second link priority indication having a higher priority than the first link priority indication and the signal quality metric exceeding a signal quality threshold, transmit the scheduled DL transmission with a transmission power back off, determine the signal quality metric based on a direct link quality and one or more pilot signals included in the response signal received from the third wireless device, and adjust the scheduled DL transmission based on the second link priority indication having a higher priority than the first link priority indication and the signal quality metric exceeding a signal quality threshold, where adjusting the scheduled UL transmission includes canceling the scheduled UL transmission responsive to the first UL scheduling information or transmitting the scheduled DL transmission with a transmission power back off.

Linking component 1135 may establish the first wireless link between the first wireless device and the second wireless device as a direct point-to-point wireless link and establish the first wireless link between the first wireless device and the second wireless device as a direct point-to-point wireless link, where the first wireless link is established prior to transmitting the scheduling information to the second wireless device. In some cases, the first wireless link is established prior to transmitting the scheduling information to the second wireless device.

Figure 12:
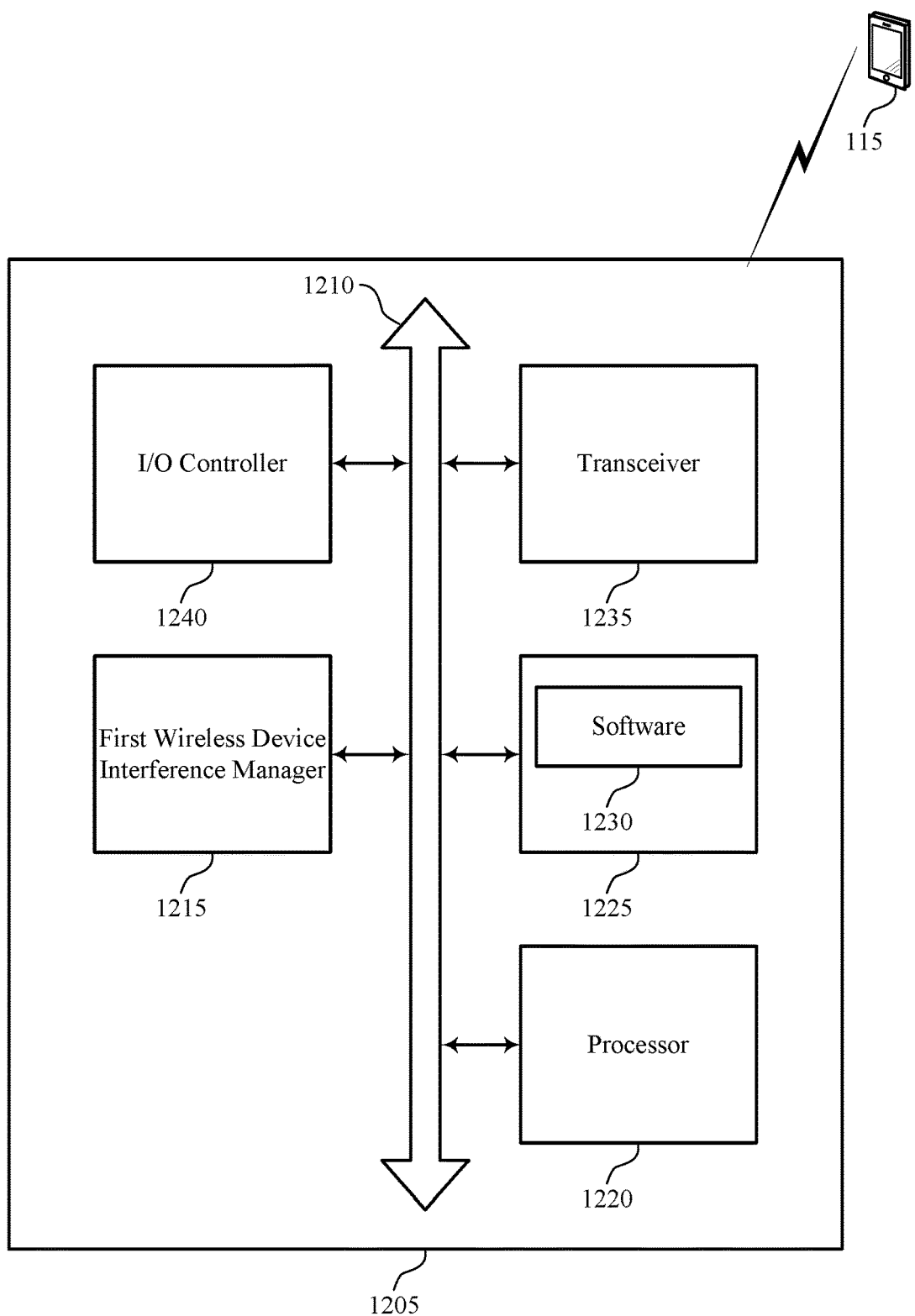
FIG. 12 illustrates a block diagram of a system including a first wireless device that supports providing interference management in accordance with aspects of the present disclosure.

FIG. 12 shows a diagram of a system 1200 including a device 1205 that supports providing interference management in accordance with various aspects of the present disclosure. Device 1205 may be an example of or include the components of wireless device 905, wireless device 1005, or a first wireless device (e.g., a primary node 217) as described above, for example, with reference to FIGS. 1-9 and 10.

Device 1205 may include components for bi-directional voice and data communications including components for transmitting and receiving communications, including first wireless device interference manager 1215, processor 1220, memory 1225, software 1230, transceiver 1235, and I/O controller 1240.

Device 1205 may include components for bi-directional voice and data communications including components for transmitting and receiving communications, including first wireless device interference manager 1215, processor 1220, memory 1225, software 1230, transceiver 1235, and I/O controller 1240.

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a Basic Input-Output system (BIOS) which may control basic hardware and/or software operation such as the interaction with peripheral components or devices.

Software 1230 may include code to implement aspects of the present disclosure, including code to support providing interference management. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

I/O controller 1240 may manage input and output signals for device 1205. Input/output control component 1240 may also manage peripherals not integrated into device 1205. In some cases, input/output control component 1240 may represent a physical connection or port to an external peripheral. In some cases, I/O controller 1240 may utilize an operating system such as iOS®, ANDROID®, MS-DOS®, MS-WINDOWS®, OS/2®, UNIX®, LINUX®, or another known operating system.

Figure 13:
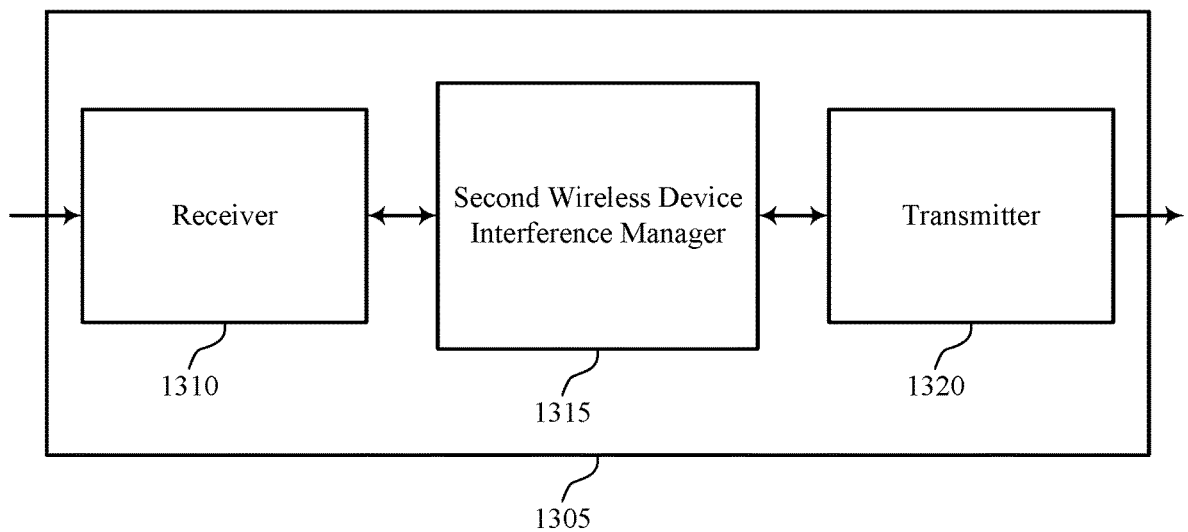
FIGS. 13 through 15 show block diagrams of a device that supports providing interference management in accordance with aspects of the present disclosure.

FIG. 13 shows a block diagram 1300 of a wireless device 1305 that supports providing interference management in accordance with various aspects of the present disclosure. Wireless device 1305 may be an example of aspects of a second wireless device (e.g., a secondary node 219) as described with reference to FIG. 1-8. Wireless device 1305 may include receiver 1310, second wireless device interference manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to providing interference management, etc.). Information may be passed on to other components of the device. The receiver 1310 may be an example of aspects of the transceiver 1635 described with reference to FIG. 16.

Second wireless device interference manager 1315 may be an example of aspects of the second wireless device interference manager 1615 described with reference to FIG. 16.

Second wireless device interference manager 1315 may receive first UL scheduling information from a first wireless device associated with a first wireless link, the first UL scheduling information including a first link priority indication associated with the first wireless link, receive a response signal from a third wireless device, the response signal being associated with a second wireless link different from the first wireless link and including a second link priority indication associated with the second wireless link, determine a signal quality metric associated with an impact of a scheduled UL transmission of the first wireless link with respect to the third wireless device, and adjust the scheduled UL transmission based on the second link priority indication having a higher priority than the first link priority indication, and the signal quality metric exceeding a signal quality threshold.

The second wireless device interference manager 1315 may also receive first DL scheduling information from a first wireless device in the wireless network, the first wireless device and the second wireless device being associated with a first wireless link, receive second link scheduling information from a third wireless device, the second link scheduling information being associated with a second wireless link different from the first wireless link, and determine whether to transmit a response signal in response to the first DL scheduling information based on a signal quality metric associated with a scheduled DL transmission of the first wireless link, the signal quality metric being determined from reception of the first DL scheduling information and the second link scheduling information.

The second wireless device interference manager 1315 may also receive first UL scheduling information from a first wireless device in the wireless network, the first wireless device and the second wireless device being associated with a first wireless link, the first UL scheduling information including a first link priority indication associated with the first wireless link, receive a response signal from a third wireless device, the response signal being associated with a second wireless link different from the first wireless link and including a second link priority indication associated with the second wireless link, where receiving the UL scheduling information includes receiving the UL scheduling information in a first portion of a frame structure associated with the wireless network, where the frame structure includes a second portion for clear-to-send signals associated with either DL or UL scheduled transmissions, and a third portion for data signals associated with either DL or UL data transmission;, determine a signal quality metric associated with an impact of a scheduled UL transmission of the first wireless link with respect to the third wireless device, where the signal quality metric includes an SINK, and adjust the scheduled UL transmission based on the second link priority indication having a higher priority than the first link priority indication, and the signal quality metric exceeding a signal quality threshold, where adjusting the scheduled UL transmission includes canceling the scheduled UL transmission responsive to the first UL scheduling information or transmitting the scheduled UL transmission with a transmission power back off.

The second wireless device interference manager 1315 may also receive first DL scheduling information from a first wireless device in the wireless network, the first wireless device and the second wireless device being associated with a first wireless link, receive second link scheduling information from a third wireless device, the second link scheduling information being associated with a second wireless link different from the first wireless link;, determine whether to transmit a response signal in response to the first DL scheduling information based on a signal quality metric associated with a scheduled DL transmission of the first wireless link, the signal quality metric being determined from reception of the first DL scheduling information and the second link scheduling information, where the response signal is a clear-to-send message, where the signal quality metric includes an SINR, and refrain from transmitting the response signal based on a determination that the signal quality metric is less than a predetermined threshold or transmitting the response signal based on a determination that the signal quality metric is equal to or greater than the predetermined threshold.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
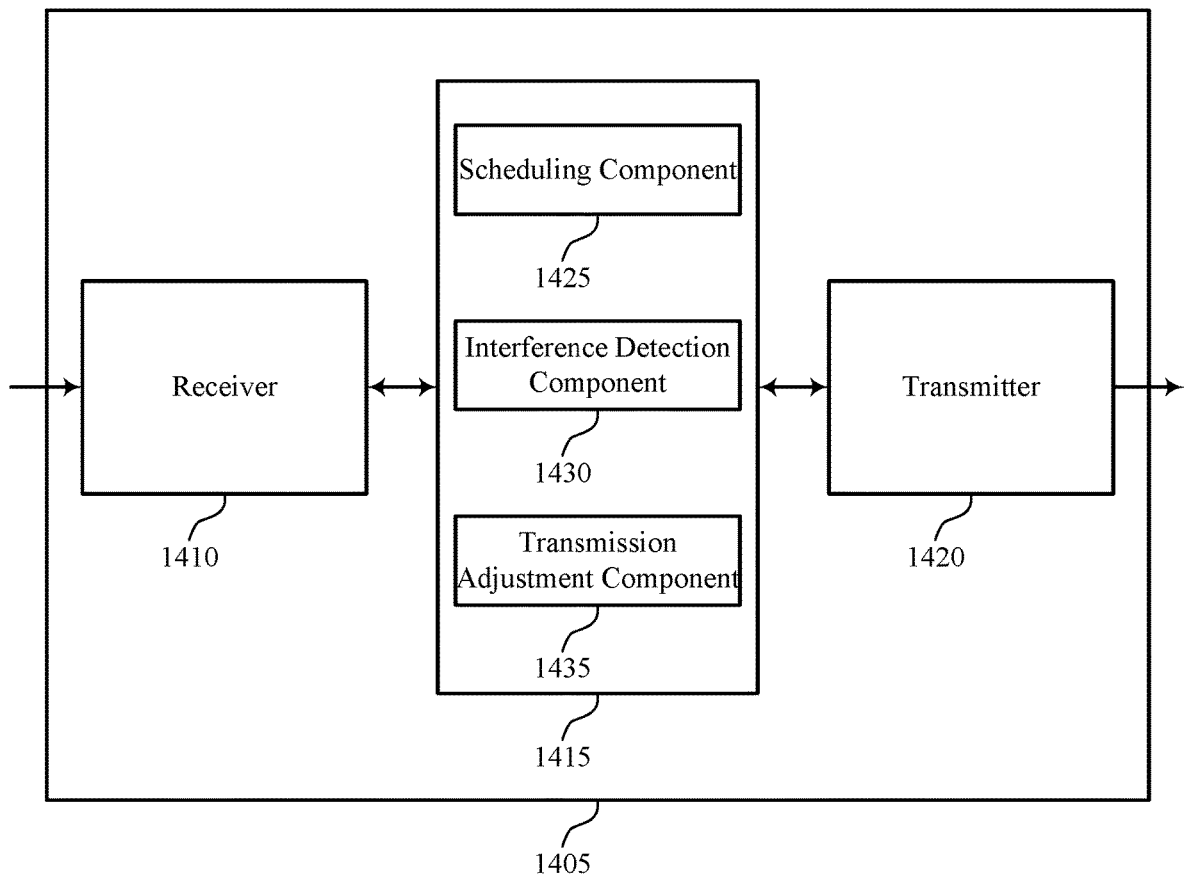

FIG. 14 shows a block diagram 1400 of a wireless device 1405 that supports providing interference management in accordance with various aspects of the present disclosure. Wireless device 1405 may be an example of aspects of a wireless device 1305 or a second wireless device (e.g., a secondary node 219) as described with reference to FIGS. 1-8 and 13. Wireless device 1405 may include receiver 1410, second wireless device interference manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to providing interference management, etc.). Information may be passed on to other components of the device. The receiver 1410 may be an example of aspects of the transceiver 1635 described with reference to FIG. 16.

Second wireless device interference manager 1415 may be an example of aspects of the second wireless device interference manager 1615 described with reference to FIG. 16.

Second wireless device interference manager 1415 may also include scheduling component 1425, interference detection component 1430, and transmission adjustment component 1435.

Scheduling component 1425 may receive first UL scheduling information from a first wireless device associated with a first wireless link, the first UL scheduling information including a first link priority indication associated with the first wireless link, receive the UL scheduling information in a first portion of a frame structure associated with the wireless network, receive first DL scheduling information from a first wireless device in the wireless network, the first wireless device and the second wireless device being associated with a first wireless link, receive second link scheduling information from a third wireless device, the second link scheduling information being associated with a second wireless link different from the first wireless link, receive first UL scheduling information from a first wireless device in the wireless network, the first wireless device and the second wireless device being associated with a first wireless link, the first UL scheduling information including a first link priority indication associated with the first wireless link, and receive second link scheduling information from a third wireless device, the second link scheduling information being associated with a second wireless link different from the first wireless link. In some cases, the frame structure includes a second portion for clear-to-send signals associated with either DL or UL scheduled transmissions, and a third portion for data signals associated with either DL or UL data transmission. In some cases, the first wireless device is a primary node in the wireless network and the second wireless device is a secondary node in the wireless network, primary nodes being configured to transmit scheduling information transmissions in the wireless network and secondary nodes being configured to receive scheduling information transmissions in the wireless network.

Interference detection component 1430 may receive a response signal from a third wireless device, the response signal being associated with a second wireless link different from the first wireless link and including a second link priority indication associated with the second wireless link, determine a signal quality metric associated with an impact of a scheduled UL transmission of the first wireless link with respect to the third wireless device, determine whether to transmit a response signal in response to the first DL scheduling information based on a signal quality metric associated with a scheduled DL transmission of the first wireless link, the signal quality metric being determined from reception of the first DL scheduling information and the second link scheduling information, receive a response signal from a third wireless device, the response signal being associated with a second wireless link different from the first wireless link and including a second link priority indication associated with the second wireless link, where receiving the UL scheduling information includes receiving the UL scheduling information in a first portion of a frame structure associated with the wireless network, where the frame structure includes a second portion for clear-to-send signals associated with either DL or UL scheduled transmissions, and a third portion for data signals associated with either DL or UL data transmission, determine a signal quality metric associated with an impact of a scheduled UL transmission of the first wireless link with respect to the third wireless device, where the signal quality metric includes an SINR, and determine whether to transmit a response signal in response to the first DL scheduling information based on a signal quality metric associated with a scheduled DL transmission of the first wireless link, the signal quality metric being determined from reception of the first DL scheduling information and the second link scheduling information, where the response signal is a clear-to-send message, where the signal quality metric includes an SINR. In some cases, the signal quality metric includes an SINR. In some cases, the signal quality metric includes an SINR. In some cases, the response signal is a clear-to-send message.

Transmission adjustment component 1435 may adjust the scheduled UL transmission based on the second link priority indication having a higher priority than the first link priority indication, and the signal quality metric exceeding a signal quality threshold, cancel the scheduled UL transmission responsive to the first UL scheduling information, transmit the scheduled UL transmission with a transmission power back off, refrain from transmitting the response signal based on a determination that the signal quality metric is less than a predetermined threshold, transmit the response signal based on a determination that the signal quality metric is equal to or greater than a predetermined threshold, adjust the scheduled UL transmission based on the second link priority indication having a higher priority than the first link priority indication, and the signal quality metric exceeding a signal quality threshold, where adjusting the scheduled UL transmission includes canceling the scheduled UL transmission responsive to the first UL scheduling information or transmitting the scheduled UL transmission with a transmission power back off, and refrain from transmitting the response signal based on a determination that the signal quality metric is less than a predetermined threshold or transmitting the response signal based on a determination that the signal quality metric is equal to or greater than the predetermined threshold.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
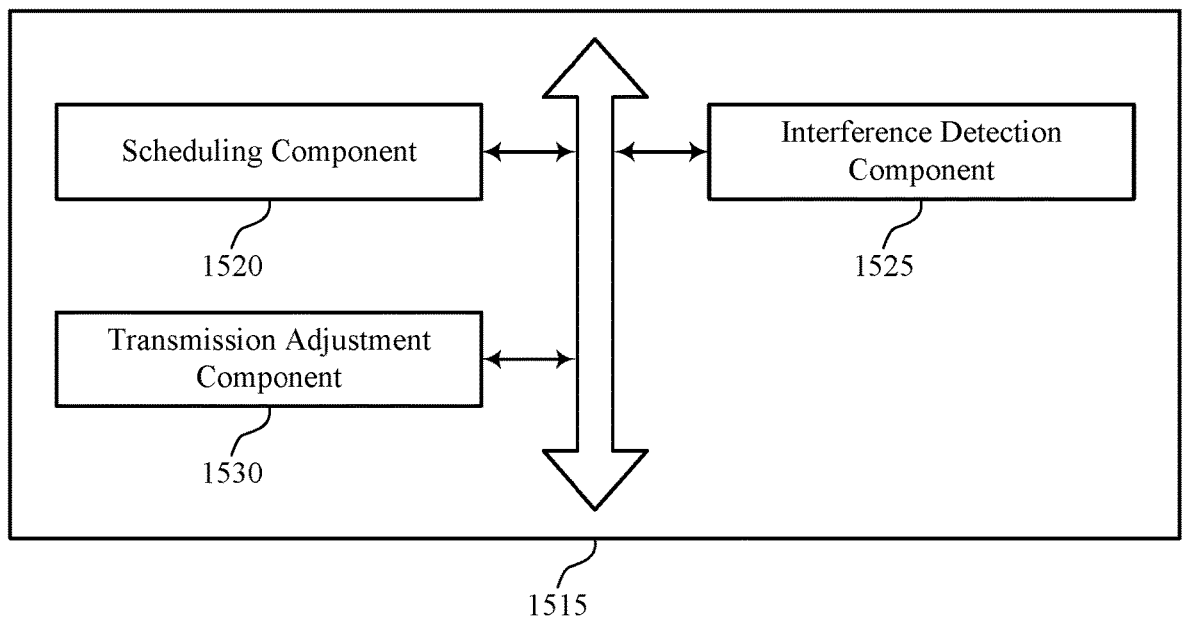

FIG. 15 shows a block diagram 1500 of a second wireless device interference manager 1515 that supports providing interference management in accordance with various aspects of the present disclosure. The second wireless device interference manager 1515 may be an example of aspects of a second wireless device interference manager 1615 described with reference to FIGS. 13, 14, and 16. The second wireless device interference manager 1515 may include scheduling component 1520, interference detection component 1525, and transmission adjustment component 1530. Each of these modules may communicate, directly or indirectly, with one another (e.g., via one or more buses).

Scheduling component 1520 may receive first UL scheduling information from a first wireless device associated with a first wireless link, the first UL scheduling information including a first link priority indication associated with the first wireless link, receive the UL scheduling information in a first portion of a frame structure associated with the wireless network, receive first DL scheduling information from a first wireless device in the wireless network, the first wireless device and the second wireless device being associated with a first wireless link, receive second link scheduling information from a third wireless device, the second link scheduling information being associated with a second wireless link different from the first wireless link, receive first UL scheduling information from a first wireless device in the wireless network, the first wireless device and the second wireless device being associated with a first wireless link, the first UL scheduling information including a first link priority indication associated with the first wireless link, and receive second link scheduling information from a third wireless device, the second link scheduling information being associated with a second wireless link different from the first wireless link. In some cases, the frame structure includes a second portion for clear-to-send signals associated with either DL or UL scheduled transmissions, and a third portion for data signals associated with either DL or UL data transmission. In some cases, the first wireless device is a primary node in the wireless network and the second wireless device is a secondary node in the wireless network, primary nodes being configured to transmit scheduling information transmissions in the wireless network and secondary nodes being configured to receive scheduling information transmissions in the wireless network.

Interference detection component 1525 may receive a response signal from a third wireless device, the response signal being associated with a second wireless link different from the first wireless link and including a second link priority indication associated with the second wireless link, determine a signal quality metric associated with an impact of a scheduled UL transmission of the first wireless link with respect to the third wireless device, determine whether to transmit a response signal in response to the first DL scheduling information based on a signal quality metric associated with a scheduled DL transmission of the first wireless link, the signal quality metric being determined from reception of the first DL scheduling information and the second link scheduling information, receive a response signal from a third wireless device, the response signal being associated with a second wireless link different from the first wireless link and including a second link priority indication associated with the second wireless link, where receiving the UL scheduling information includes receiving the UL scheduling information in a first portion of a frame structure associated with the wireless network, where the frame structure includes a second portion for clear-to-send signals associated with either DL or UL scheduled transmissions, and a third portion for data signals associated with either DL or UL data transmission, determine a signal quality metric associated with an impact of a scheduled UL transmission of the first wireless link with respect to the third wireless device, where the signal quality metric includes an SINR, and determine whether to transmit a response signal in response to the first DL scheduling information based on a signal quality metric associated with a scheduled DL transmission of the first wireless link, the signal quality metric being determined from reception of the first DL scheduling information and the second link scheduling information, where the response signal is a clear-to-send message, where the signal quality metric includes an SINR.

Transmission adjustment component 1530 may adjust the scheduled UL transmission based on the second link priority indication having a higher priority than the first link priority indication, and the signal quality metric exceeding a signal quality threshold, cancel the scheduled UL transmission responsive to the first UL scheduling information, transmit the scheduled UL transmission with a transmission power back off, refrain from transmitting the response signal based on a determination that the signal quality metric is less than a predetermined threshold, transmit the response signal based on a determination that the signal quality metric is equal to or greater than a predetermined threshold, adjust the scheduled UL transmission based on the second link priority indication having a higher priority than the first link priority indication, and the signal quality metric exceeding a signal quality threshold, where adjusting the scheduled UL transmission includes canceling the scheduled UL transmission responsive to the first UL scheduling information or transmitting the scheduled UL transmission with a transmission power back off, and refrain from transmitting the response signal based on a determination that the signal quality metric is less than a predetermined threshold or transmitting the response signal based on a determination that the signal quality metric is equal to or greater than the predetermined threshold.

Figure 16:
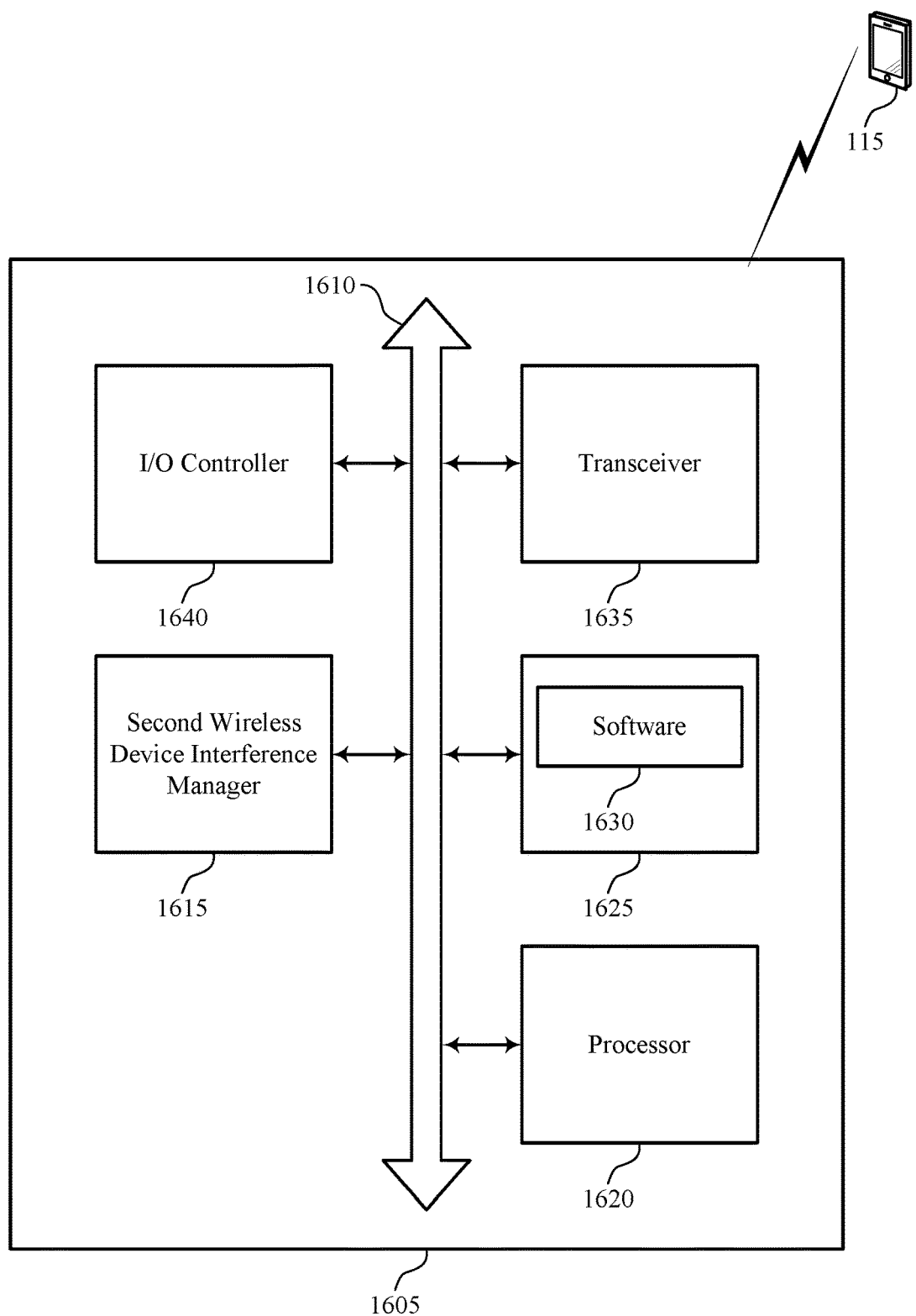
FIG. 16 illustrates a block diagram of a system including a second wireless device that supports providing interference management in accordance with aspects of the present disclosure.

FIG. 16 shows a diagram of a system 1600 including a device 1605 that supports providing interference management in accordance with various aspects of the present disclosure. Device 1605 may be an example of or include the components of a second wireless device (e.g., a secondary node 219) as described above, e.g., with reference to FIGS. 1-8.

Device 1605 may include components for bi-directional voice and data communications including components for transmitting and receiving communications, including second wireless device interference manager 1615, processor 1620, memory 1625, software 1630, transceiver 1635, and I/O controller 1640, which may communicate via one or more buses (e.g., bus 1610).

Processor 1620 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting providing interference management).1620.

Memory 1625 may include random access memory (RAM) and read only memory (ROM). The memory 1625 may store computer-readable, computer-executable software 1630 including instructions that, when executed, cause the processor to perform various functions described herein. In some cases, the memory 1625 may contain, among other things, a Basic Input-Output system (BIOS) which may control basic hardware and/or software operation such as the interaction with peripheral components or devices.

Software 1630 may include code to implement aspects of the present disclosure, including code to support providing interference management. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

I/O controller 1640 may manage input and output signals for device 1605. Input/output control component 1640 may also manage peripherals not integrated into device 1605. In some cases, input/output control component 1640 may represent a physical connection or port to an external peripheral. In some cases, I/O controller 1640 may utilize an operating system such as iOS®, ANDROID®, MS-DOS®, MS-WINDOWS®, OS/2®, UNIX®, LINUX®, or another known operating system.

Figure 17:
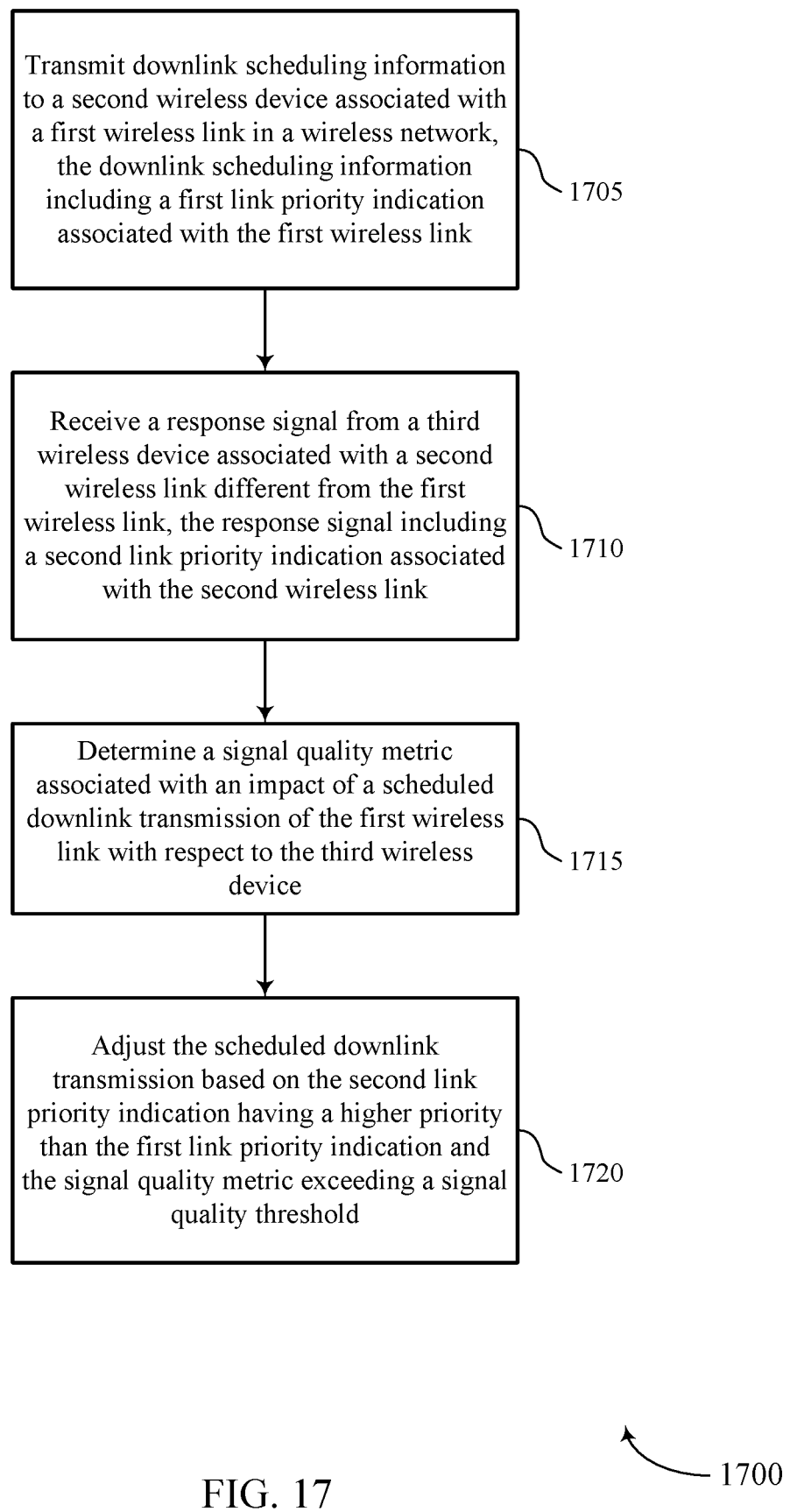
FIGS. 17 through 22 illustrate methods for providing interference management in accordance with aspects of the present disclosure.

FIG. 17 shows a flowchart illustrating a method 1700 for providing interference management in accordance with various aspects of the present disclosure. The operations of method 1700 may be implemented by a first wireless device (e.g., a primary node 217) or its components as described herein. For example, the operations of method 1700 may be performed by a first wireless device interference manager as described with reference to FIGS. 9 through 12. In some examples, a first wireless device may execute a set of codes to control the functional elements of the device to perform the functions described below. Additionally or alternatively, the first wireless device may perform aspects the functions described below using special-purpose hardware.

At block 1705, the first wireless device may transmit DL scheduling information to a second wireless device associated with a first wireless link in a wireless network, the DL scheduling information including a first link priority indication associated with the first wireless link. The operations of block 1705 may be performed according to the methods described with reference to FIGS. 1 through 8. In certain examples, aspects of the operations of block 1705 may be performed by a scheduling component as described with reference to FIGS. 9 through 12.

At block 1710, the first wireless device may receive a response signal from a third wireless device associated with a second wireless link different from the first wireless link, the response signal including a second link priority indication associated with the second wireless link. The operations of block 1710 may be performed according to the methods described with reference to FIGS. 1 through 8. In certain examples, aspects of the operations of block 1710 may be performed by an interference detection component as described with reference to FIGS. 9 through 12.

At block 1715, the first wireless device may determine a signal quality metric associated with an impact of a scheduled DL transmission of the first wireless link with respect to the third wireless device. The operations of block 1715 may be performed according to the methods described with reference to FIGS. 1 through 8. In certain examples, aspects of the operations of block 1715 may be performed by an interference detection component as described with reference to FIGS. 9 through 12.

At block 1720, the first wireless device may adjust the scheduled DL transmission based on the second link priority indication having a higher priority than the first link priority indication and the signal quality metric exceeding a signal quality threshold. The operations of block 1720 may be performed according to the methods described with reference to FIGS. 1 through 8. In certain examples, aspects of the operations of block 1720 may be performed by a transmission adjustment component as described with reference to FIGS. 9 through 12.

Figure 18:
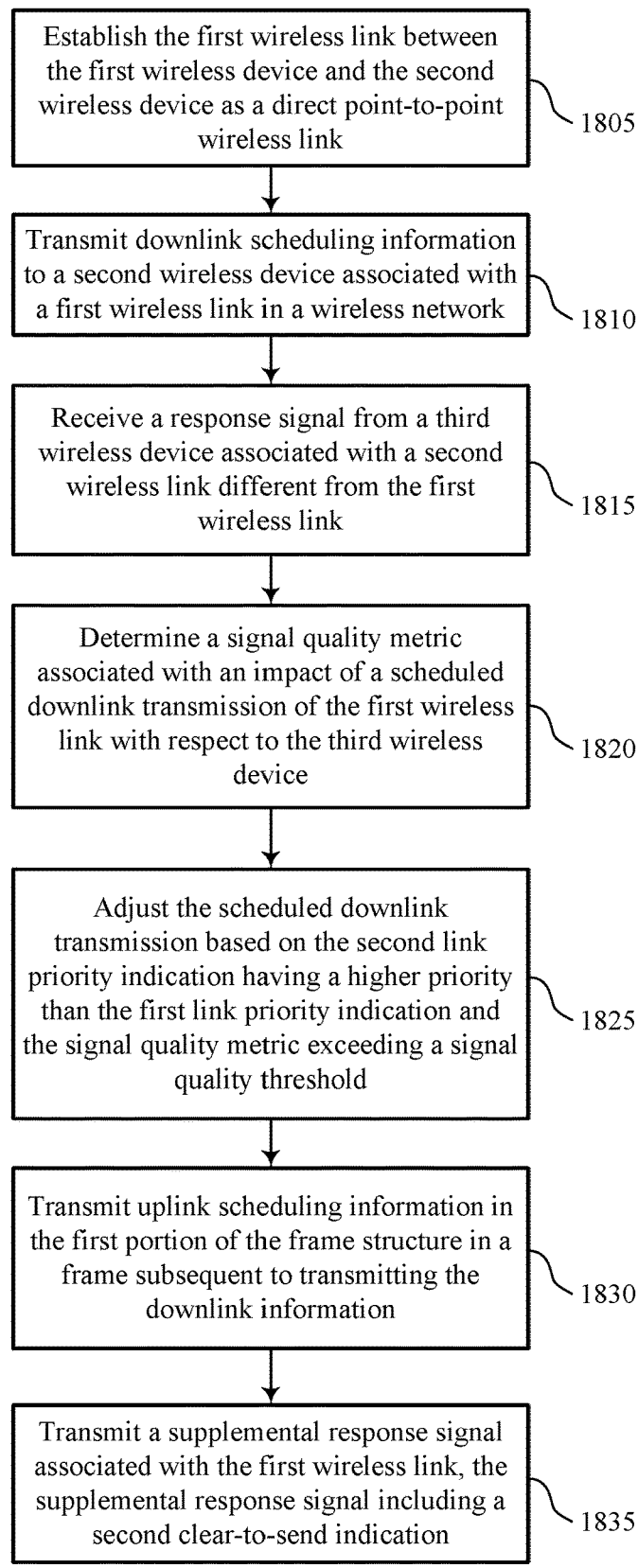

FIG. 18 shows a flowchart illustrating a method 1800 for providing interference management in accordance with various aspects of the present disclosure. The operations of method 1800 may be implemented by a first wireless device (e.g., a primary node 217) or its components as described herein. For example, the operations of method 1800 may be performed by a first wireless device interference manager as described with reference to FIGS. 9 through 12. In some examples, a first wireless device may execute a set of codes to control the functional elements of the device to perform the functions described below. Additionally or alternatively, the first wireless device may perform aspects the functions described below using special-purpose hardware.

At block 1805, the first wireless device may establish the first wireless link between the first wireless device and the second wireless device as a direct point-to-point wireless link, where the first wireless link is established prior to transmitting the scheduling information to the second wireless device. The operations of block 1805 may be performed according to the methods described with reference to FIGS. 1 through 8. In certain examples, aspects of the operations of block 1805 may be performed by a linking component as described with reference to FIGS. 9 through 12.

At block 1810, the first wireless device may transmit DL scheduling information to a second wireless device associated with a first wireless link in a wireless network, the DL scheduling information including a first link priority indication associated with the first wireless link, where transmitting the DL scheduling information includes transmitting the DL scheduling information in a first portion of a frame structure associated with the wireless network, where the frame structure includes a second portion for response signals associated with either DL or UL response transmissions, and a third portion for data signals associated with either DL or UL data transmission. The operations of block 1810 may be performed according to the methods described with reference to FIGS. 1 through 8. In certain examples, aspects of the operations of block 1810 may be performed by a scheduling component as described with reference to FIGS. 9 through 12.

At block 1815, the first wireless device may receive a response signal from a third wireless device associated with a second wireless link different from the first wireless link, the response signal including a second link priority indication associated with the second wireless link, where receiving the UL scheduling information includes receiving the UL scheduling information in a first portion of a frame structure associated with the wireless network. The operations of block 1815 may be performed according to the methods described with reference to FIGS. 1 through 8. In certain examples, aspects of the operations of block 1815 may be performed by an interference detection component as described with reference to FIGS. 9 through 12.

At block 1820, the first wireless device may determine a signal quality metric associated with an impact of a scheduled DL transmission of the first wireless link with respect to the third wireless device, where determining the signal quality metric includes determining the signal quality metric based on a direct link quality and one or more pilot signals included in the response signal received from the third wireless device, where the signal quality metric includes an SINR. The operations of block 1820 may be performed according to the methods described with reference to FIGS. 1 through 8. In certain examples, aspects of the operations of block 1820 may be performed by an interference detection component as described with reference to FIGS. 9 through 12.

At block 1825, the first wireless device may adjust the scheduled DL transmission based on the second link priority indication having a higher priority than the first link priority indication and the signal quality metric exceeding a signal quality threshold, where adjusting the scheduled UL transmission includes canceling the scheduled UL transmission responsive to the first UL scheduling information or transmitting the scheduled DL transmission with a transmission power back off. The operations of block 1825 may be performed according to the methods described with reference to FIGS. 1 through 8. In certain examples, aspects of the operations of block 1825 may be performed by a transmission adjustment component as described with reference to FIGS. 9 through 12.

At block 1830, the first wireless device may transmit UL scheduling information in the first portion of the frame structure in a frame subsequent to transmitting the DL information, the UL scheduling information including a first clear-to-send message. The operations of block 1830 may be performed according to the methods described with reference to FIGS. 1 through 8. In certain examples, aspects of the operations of block 1830 may be performed by a scheduling component as described with reference to FIGS. 9 through 12.

At block 1835, the first wireless device may transmit a supplemental response signal associated with the first wireless link, the supplemental response signal including a second clear-to-send message. The operations of block 1835 may be performed according to the methods described with reference to FIGS. 1 through 8. In certain examples, aspects of the operations of block 1835 may be performed by a scheduling component as described with reference to FIGS. 9 through 12.

Figure 19:
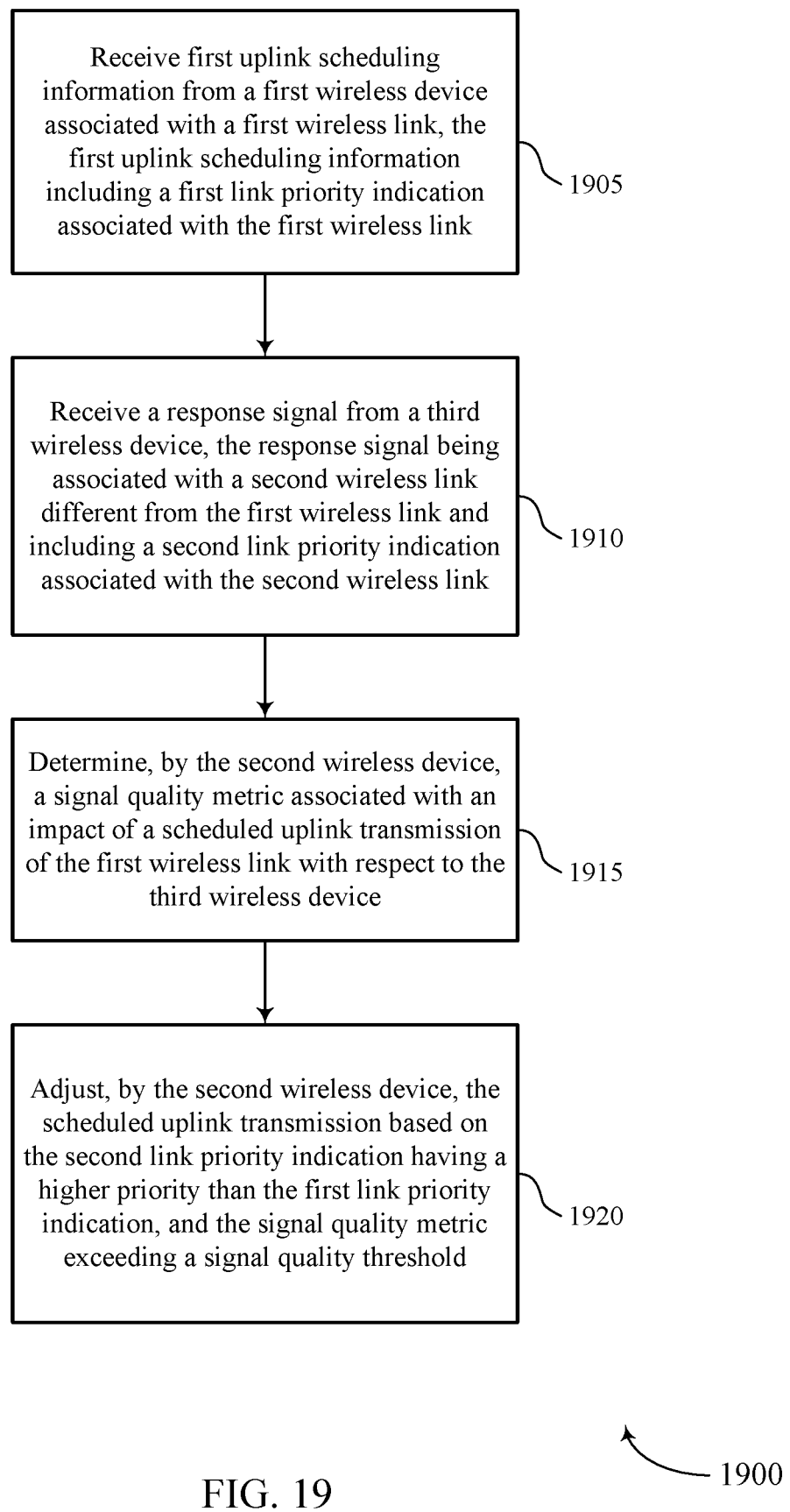

FIG. 19 shows a flowchart illustrating a method 1900 for providing interference management in accordance with various aspects of the present disclosure. The operations of method 1900 may be implemented by a second wireless device (e.g., a secondary node 219) or its components as described herein. For example, the operations of method 1900 may be performed by a second wireless device interference manager as described with reference to FIGS. 13 through 16. In some examples, a second wireless device may execute a set of codes to control the functional elements of the device to perform the functions described below. Additionally or alternatively, the second wireless device may perform aspects the functions described below using special-purpose hardware.

At block 1905, the second wireless device may receive first UL scheduling information from a first wireless device associated with a first wireless link, the first UL scheduling information including a first link priority indication associated with the first wireless link. The operations of block 1905 may be performed according to the methods described with reference to FIGS. 1 through 8. In certain examples, aspects of the operations of block 1905 may be performed by a scheduling component as described with reference to FIGS. 13 through 16.

At block 1910, the second wireless device may receive a response signal from a third wireless device, the response signal being associated with a second wireless link different from the first wireless link and including a second link priority indication associated with the second wireless link. The operations of block 1910 may be performed according to the methods described with reference to FIGS. 1 through 8. In certain examples, aspects of the operations of block 1910 may be performed by an interference detection component as described with reference to FIGS. 13 through 16.

At block 1915, the second wireless device may determine a signal quality metric associated with an impact of a scheduled UL transmission of the first wireless link with respect to the third wireless device. The operations of block 1915 may be performed according to the methods described with reference to FIGS. 1 through 8. In certain examples, aspects of the operations of block 1915 may be performed by an interference detection component as described with reference to FIGS. 13 through 16.

At block 1920, the second wireless device may adjust the scheduled UL transmission based on the second link priority indication having a higher priority than the first link priority indication, and the signal quality metric exceeding a signal quality threshold. The operations of block 1920 may be performed according to the methods described with reference to FIGS. 1 through 8. In certain examples, aspects of the operations of block 1920 may be performed by a transmission adjustment component as described with reference to FIGS. 13 through 16.

Figure 20:
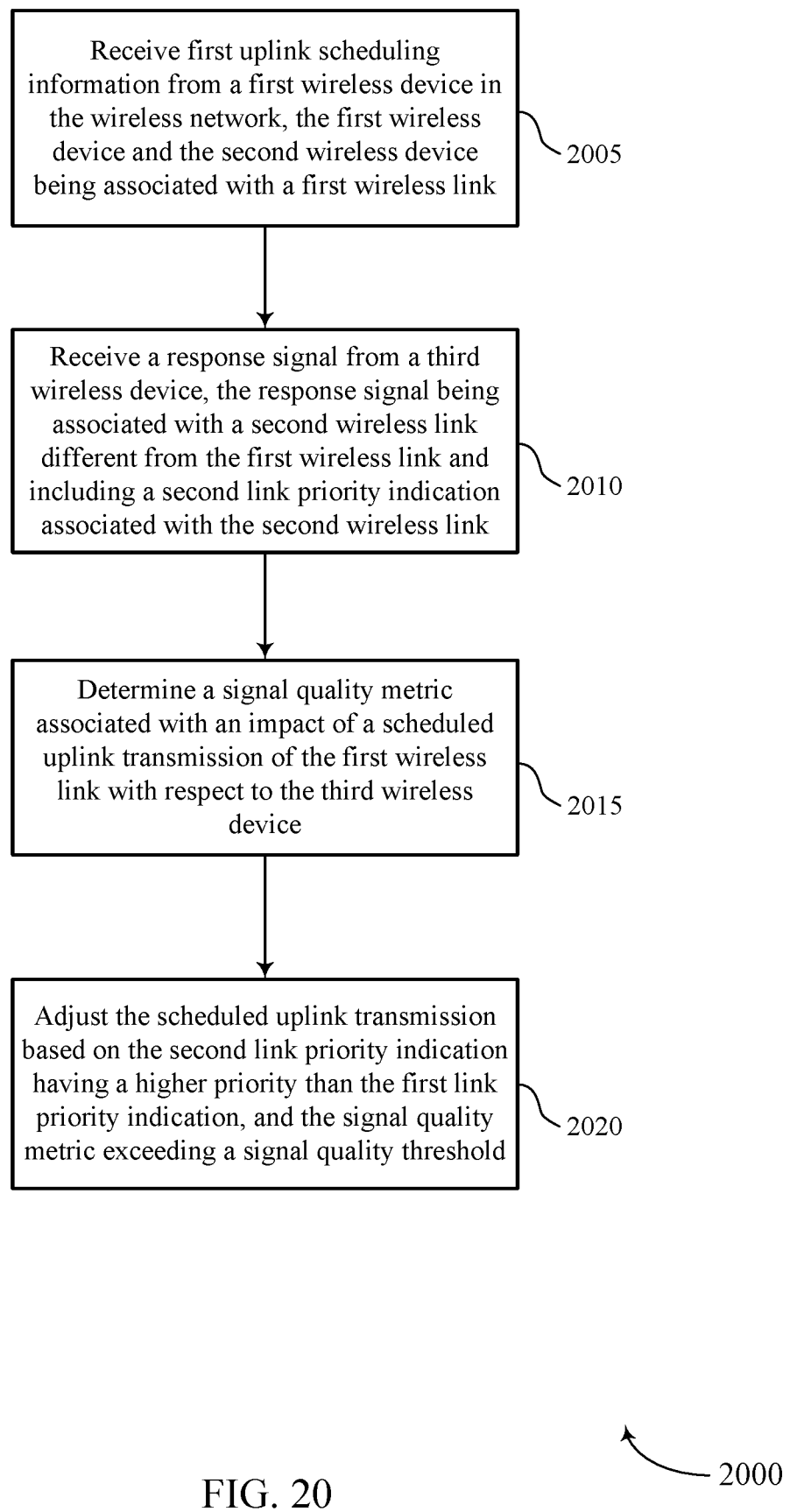

FIG. 20 shows a flowchart illustrating a method 2000 for providing interference management in accordance with various aspects of the present disclosure. The operations of method 2000 may be implemented by a second wireless device (e.g., a secondary node 219) or its components as described herein. For example, the operations of method 2000 may be performed by a second wireless device interference manager as described with reference to FIGS. 13 through 16. In some examples, a second wireless device may execute a set of codes to control the functional elements of the device to perform the functions described below. Additionally or alternatively, the second wireless device may perform aspects the functions described below using special-purpose hardware.

At block 2005, the second wireless device may receive first UL scheduling information from a first wireless device in the wireless network, the first wireless device and the second wireless device being associated with a first wireless link, the first UL scheduling information including a first link priority indication associated with the first wireless link. The operations of block 2005 may be performed according to the methods described with reference to FIGS. 1 through 8. In certain examples, aspects of the operations of block 2005 may be performed by a scheduling component as described with reference to FIGS. 13 through 16.

At block 2010, the second wireless device may receive a response signal from a third wireless device, the response signal being associated with a second wireless link different from the first wireless link and including a second link priority indication associated with the second wireless link, where receiving the UL scheduling information includes receiving the UL scheduling information in a first portion of a frame structure associated with the wireless network, where the frame structure includes a second portion for clear-to-send signals associated with either DL or UL scheduled transmissions, and a third portion for data signals associated with either DL or UL data transmission. The operations of block 2010 may be performed according to the methods described with reference to FIGS. 1 through 8. In certain examples, aspects of the operations of block 2010 may be performed by an interference detection component as described with reference to FIGS. 13 through 16.

At block 2015, the second wireless device may determine a signal quality metric associated with an impact of a scheduled UL transmission of the first wireless link with respect to the third wireless device, where the signal quality metric includes an SINR. The operations of block 2015 may be performed according to the methods described with reference to FIGS. 1 through 8. In certain examples, aspects of the operations of block 2015 may be performed by an interference detection component as described with reference to FIGS. 13 through 16.

At block 2020, the second wireless device may adjust the scheduled UL transmission based on the second link priority indication having a higher priority than the first link priority indication, and the signal quality metric exceeding a signal quality threshold, where adjusting the scheduled UL transmission includes canceling the scheduled UL transmission responsive to the first UL scheduling information or transmitting the scheduled UL transmission with a transmission power back off. The operations of block 2020 may be performed according to the methods described with reference to FIGS. 1 through 8. In certain examples, aspects of the operations of block 2020 may be performed by a transmission adjustment component as described with reference to FIGS. 13 through 16.

Figure 21:
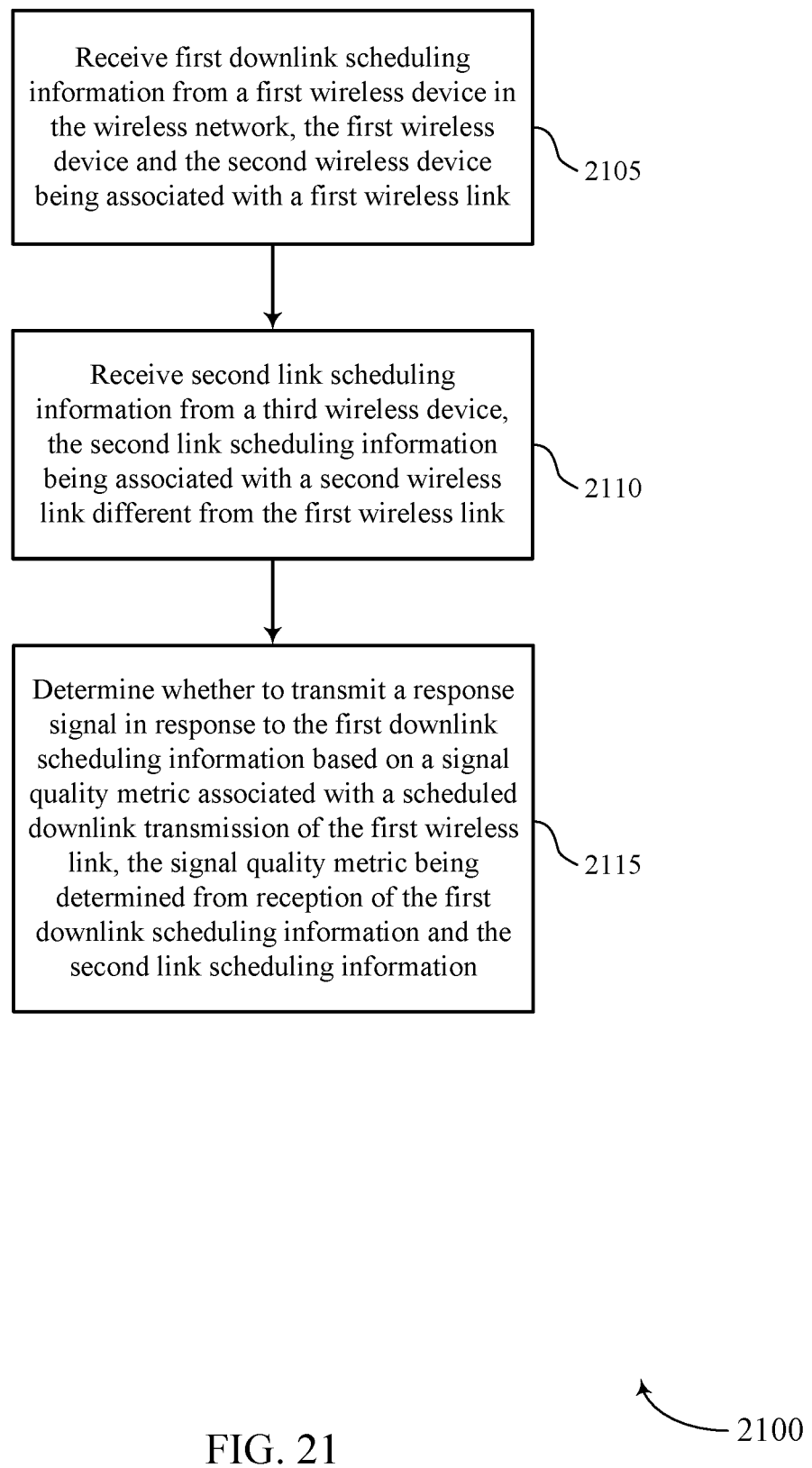

FIG. 21 shows a flowchart illustrating a method 2100 for providing interference management in accordance with various aspects of the present disclosure. The operations of method 2100 may be implemented by a second wireless device (e.g., a secondary node 219) or its components as described herein. For example, the operations of method 2100 may be performed by a second wireless device interference manager as described with reference to FIGS. 13 through 16. In some examples, a second wireless device may execute a set of codes to control the functional elements of the device to perform the functions described below. Additionally or alternatively, the second wireless device may perform aspects the functions described below using special-purpose hardware.

At block 2105, the second wireless device may receive first DL scheduling information from a first wireless device in the wireless network, the first wireless device and the second wireless device being associated with a first wireless link. The operations of block 2105 may be performed according to the methods described with reference to FIGS. 1 through 8. In certain examples, aspects of the operations of block 2105 may be performed by a scheduling component as described with reference to FIGS. 13 through 16.

At block 2110, the second wireless device may receive second link scheduling information from a third wireless device, the second link scheduling information being associated with a second wireless link different from the first wireless link. The operations of block 2110 may be performed according to the methods described with reference to FIGS. 1 through 8. In certain examples, aspects of the operations of block 2110 may be performed by a scheduling component as described with reference to FIGS. 13 through 16.

At block 2115, the second wireless device may determine whether to transmit a response signal in response to the first DL scheduling information based on a signal quality metric associated with a scheduled DL transmission of the first wireless link, the signal quality metric being determined from reception of the first DL scheduling information and the second link scheduling information. The operations of block 2115 may be performed according to the methods described with reference to FIGS. 1 through 8. In certain examples, aspects of the operations of block 2115 may be performed by an interference detection component as described with reference to FIGS. 13 through 16.

Figure 22:
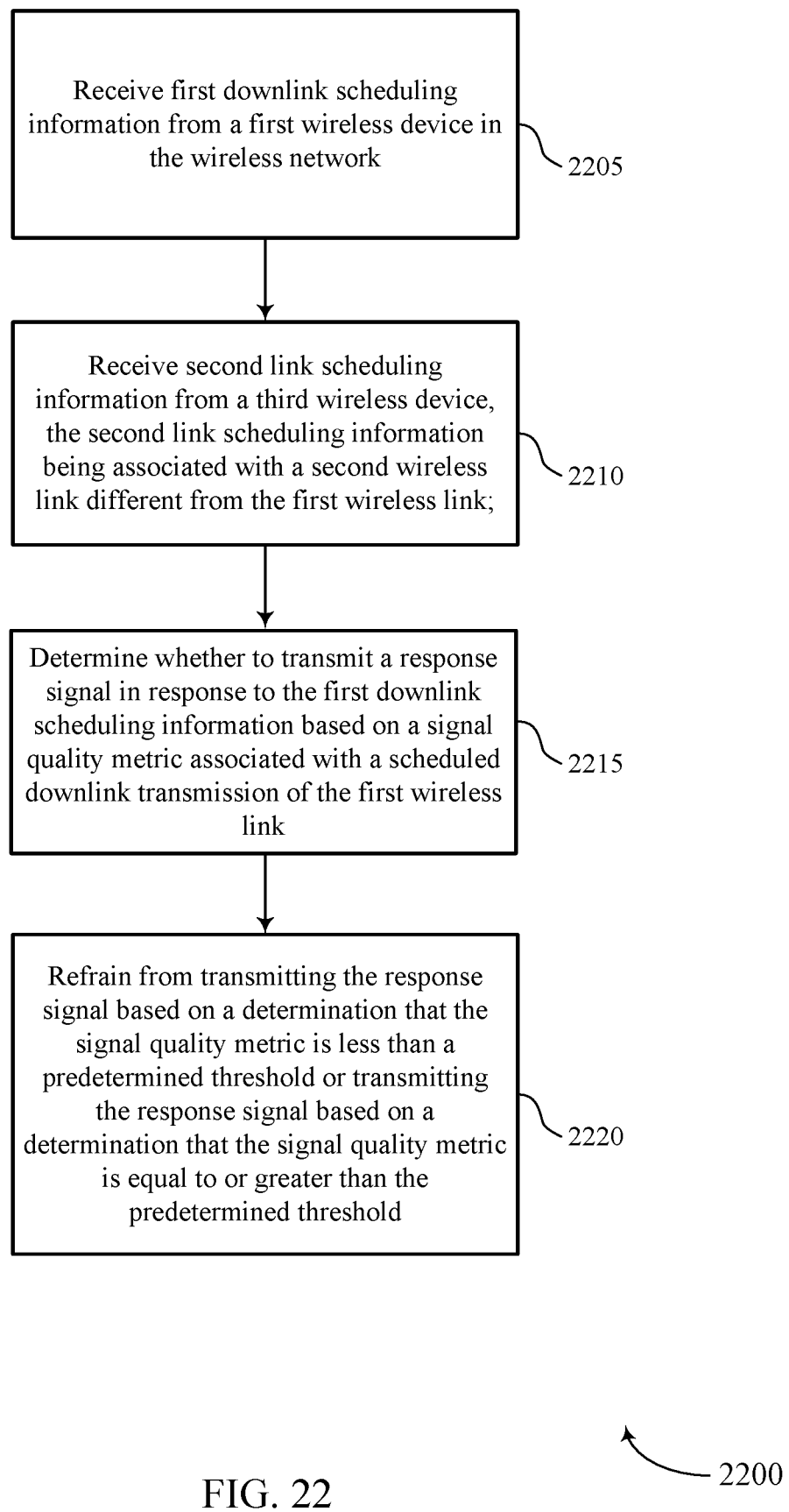

FIG. 22 shows a flowchart illustrating a method 2200 for providing interference management in accordance with various aspects of the present disclosure. The operations of method 2200 may be implemented by a second wireless device (e.g., a secondary node 219) or its components as described herein. For example, the operations of method 2200 may be performed by a second wireless device interference manager as described with reference to FIGS. 13 through 16. In some examples, a second wireless device may execute a set of codes to control the functional elements of the device to perform the functions described below. Additionally or alternatively, the second wireless device may perform aspects the functions described below using special-purpose hardware.

At block 2205, the second wireless device may receive first DL scheduling information from a first wireless device in the wireless network, the first wireless device and the second wireless device being associated with a first wireless link. The operations of block 2205 may be performed according to the methods described with reference to FIGS. 1 through 8. In certain examples, aspects of the operations of block 2205 may be performed by a scheduling component as described with reference to FIGS. 13 through 16.

At block 2210, the second wireless device may receive second link scheduling information from a third wireless device, the second link scheduling information being associated with a second wireless link different from the first wireless link. The operations of block 2210 may be performed according to the methods described with reference to FIGS. 1 through 8. In certain examples, aspects of the operations of block 2210 may be performed by a scheduling component as described with reference to FIGS. 13 through 16.

At block 2215, the second wireless device may determine whether to transmit a response signal in response to the first DL scheduling information based on a signal quality metric associated with a scheduled DL transmission of the first wireless link, the signal quality metric being determined from reception of the first DL scheduling information and the second link scheduling information, where the response signal is a clear-to-send message, where the signal quality metric includes an SINR. The operations of block 2215 may be performed according to the methods described with reference to FIGS. 1 through 8. In certain examples, aspects of the operations of block 2215 may be performed by an interference detection component as described with reference to FIGS. 13 through 16.

At block 2220, the second wireless device may refrain from transmitting the response signal based on a determination that the signal quality metric is less than a predetermined threshold or transmitting the response signal based on a determination that the signal quality metric is equal to or greater than the predetermined threshold. The operations of block 2220 may be performed according to the methods described with reference to FIGS. 1 through 8. In certain examples, aspects of the operations of block 2220 may be performed by a transmission adjustment component as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein—including, for example, wireless communications system 100 and wireless mesh network 200 of FIGS. 1 and 2, respectively—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for synchronized and slotted wireless communication in a wireless network, comprising:

transmitting, by a first wireless device, downlink scheduling information to a second wireless device in the wireless network, the first wireless device and the second wireless device being associated with a first wireless link, the downlink scheduling information including a first link priority indication associated with the first wireless link;

receiving, by the first wireless device, a response signal from a third wireless device associated with a second wireless link different from the first wireless link, the response signal including a second link priority indication associated with the second wireless link and a direct link quality, a value of the direct link quality being based at least in part on the downlink scheduling information transmitted by the first wireless device;

determining, by the first wireless device, a signal quality metric associated with an impact of a scheduled downlink transmission of the first wireless link with respect to the third wireless device; and adjusting, by the first wireless device, the scheduled downlink transmission based at least in part on the second link priority indication having a higher priority than the first link priority indication and the signal quality metric exceeding a signal quality threshold.

2. The method of claim 1, wherein adjusting the scheduled downlink transmission comprises:
canceling the scheduled downlink transmission.

3. The method of claim 1, wherein adjusting the scheduled downlink transmission comprises:
transmitting the scheduled downlink transmission with a transmission power back off.

4. The method of claim 1, wherein determining the signal quality metric comprises:
determining the signal quality metric based at least in part on the direct link quality and one or more pilot signals included in the response signal received from the third wireless device.

5. The method of claim 1, further comprising:
establishing the first wireless link between the first wireless device and the second wireless device as a direct point-to-point wireless link.

6. The method of claim 5, wherein the first wireless link is established prior to transmitting the downlink scheduling information to the second wireless device.

7. The method of claim 1, wherein transmitting the downlink scheduling information comprises:
transmitting the downlink scheduling information in a first portion of a frame structure associated with the wireless network.

8. The method of claim 7, wherein the frame structure comprises a second portion for response signals associated with either downlink or uplink response transmissions, and a third portion for data signals associated with either downlink or uplink data transmission.

9. The method of claim 7, further comprising:
transmitting, by the first wireless device, uplink scheduling information in the first portion of the frame structure in a frame subsequent to transmitting the downlink scheduling information, the uplink scheduling information including a first clear-to-send message.

10. The method of claim 9, further comprising:
transmitting, by the first wireless device, a supplemental response signal associated with the first wireless link, the supplemental response signal including a second clear-to-send message.

11. The method of claim 1, wherein the signal quality metric comprises a signal to interference-plus-noise ratio.

12. The method of claim 1, wherein the first wireless device is a primary node in the wireless network and the second wireless device is a secondary node in the wireless network, primary nodes being configured to transmit scheduling information transmissions in the wireless network and secondary nodes being configured to receive scheduling information transmissions in the wireless network.

13. A method for synchronized and slotted wireless communication in a wireless network, comprising:
receiving, by a second wireless device, first uplink scheduling information from a first wireless device in the wireless network, the first wireless device and the second wireless device being associated with a first wireless link, the first uplink scheduling information including a first link priority indication associated with the first wireless link;
receiving, by the second wireless device, a response signal from a third wireless device, the response signal being associated with downlink scheduling information of a second wireless link different from the first wireless link and including a second link priority indication associated with the second wireless link;
determining, by the second wireless device, a signal quality metric associated with an impact of a scheduled uplink transmission of the first wireless link with respect to the third wireless device, wherein the signal quality metric comprises a signal to interference-plus-noise ratio; and
transmitting, by the second wireless device, the scheduled uplink transmission with a transmission power back off based at least in part on the second link priority indication having a higher priority than the first link priority indication, and the signal quality metric exceeding a signal quality threshold.

14. The method of claim 13, wherein receiving the first uplink scheduling information comprises:
receiving the first uplink scheduling information in a first portion of a frame structure associated with the wireless network.

15. The method of claim 14, wherein the frame structure comprises a second portion for clear-to-send signals associated with either downlink or uplink scheduled transmissions, and a third portion for data signals associated with either downlink or uplink data transmission.

16. The method of claim 13, wherein the first wireless device is a primary node in the wireless network and the second wireless device is a secondary node in the wireless network, primary nodes being configured to transmit scheduling information transmissions in the wireless network and secondary nodes being configured to receive scheduling information transmissions in the wireless network.

17. A method for synchronized and slotted wireless communication in a wireless network, comprising:
receiving, by a second wireless device, first downlink scheduling information from a first wireless device in the wireless network, the first wireless device and the second wireless device being associated with a first wireless link;
receiving, by the second wireless device, second link scheduling information from a third wireless device, the second link scheduling information being associated with downlink scheduling information of a second wireless link different from the first wireless link;
determining a signal quality metric associated with a scheduled downlink transmission of the first wireless link, the signal quality metric being determined from reception of the first downlink scheduling information and the second link scheduling information, wherein the signal quality metric comprises a signal to interference-plus-noise ratio; and
transmitting a response signal that is orthogonal with respect to the received second link scheduling information and includes a first link priority indication associated with the first wireless link, the transmitting the response signal being based at least in part on a comparison of the signal quality metric to a threshold.

18. The method of claim 17, wherein the response signal is a clear-to-send message.

19. An apparatus for wireless communication, comprising:
means for transmitting downlink scheduling information to a second wireless device associated with a first wireless link in a wireless network, the downlink scheduling information including a first link priority indication associated with the first wireless link;

means for receiving a response signal from a third wireless device associated with a second wireless link different from the first wireless link, the response signal including a second link priority indication associated with the second wireless link and a direct link quality, a value of the direct link quality being based at least in part on the downlink scheduling information transmitted by the first wireless device;

means for determining a signal quality metric associated with an impact of a scheduled downlink transmission of the first wireless link with respect to the third wireless device; and means for adjusting the scheduled downlink transmission based at least in part on the second link priority indication having a higher priority than the first link priority indication and the signal quality metric exceeding a signal quality threshold.

20. The apparatus of claim 19, further comprising:
means for canceling the scheduled downlink transmission.

21. The apparatus of claim 19, further comprising:
means for transmitting the scheduled downlink transmission with a transmission power back off.

22. The apparatus of claim 19, further comprising:
means for determining the signal quality metric based at least in part on the direct link quality and one or more pilot signals included in the response signal received from the third wireless device.

23. The apparatus of claim 19, further comprising:
means for establishing the first wireless link between the apparatus and the second wireless device as a direct point-to-point wireless link.

24. An apparatus for wireless communication, comprising:
means for receiving first uplink scheduling information from a first wireless device associated with a first wireless link, the first uplink scheduling information including a first link priority indication associated with the first wireless link;

means for receiving a response signal from a third wireless device, the response signal being associated with downlink scheduling information of a second wireless link different from the first wireless link and including a second link priority indication associated with the second wireless link;

means for determining a signal quality metric associated with an impact of a scheduled uplink transmission of the first wireless link with respect to the third wireless device, wherein the signal quality metric comprises a signal to interference-plus-noise ratio; and means for transmitting, by the second wireless device, the scheduled uplink transmission with a transmission power back off based at least in part on the second link priority indication having a higher priority than the first link priority indication, and the signal quality metric exceeding a signal quality threshold.

25. The apparatus of claim 24, further comprising:
means for receiving the first uplink scheduling information in a first portion of a frame structure associated with synchronized and slotted wireless communication in a wireless network.

26. An apparatus for wireless communication, comprising:
means for receiving first downlink scheduling information from a first wireless device in a wireless network, the first wireless device and the apparatus being associated with a first wireless link;

means for receiving second link scheduling information from a third wireless device, the second link scheduling information being associated with downlink scheduling information of a second wireless link different from the first wireless link;

means for determining a signal quality metric associated with a scheduled downlink transmission of the first wireless link, the signal quality metric being determined from reception of the first downlink scheduling information and the second link scheduling information, wherein the signal quality metric comprises a signal to interference-plus-noise ratio; and means for transmitting a response signal that is orthogonal with respect to the received second link scheduling information and includes a first link priority indication associated with the first wireless link, the transmitting the response signal being based at least in part on a comparison of the signal quality metric to a threshold.

27. The apparatus of claim 26, wherein the response signal is a clear-to-send message.

28. An apparatus for wireless communication, in a system comprising:
a processor;
memory in electronic communication with the processor; and
instructions stored in the memory and operable, when executed by the processor, to cause the apparatus to: transmit downlink scheduling information to a second wireless device associated with a first wireless link in a wireless network, the downlink scheduling information including a first link priority indication associated with the first wireless link; receive a response signal from a third wireless device associated with a second wireless link different from the first wireless link, the response signal including a second link priority indication associated with the second wireless link and a direct link quality, a value of the direct link quality being based at least in part on the downlink scheduling information transmitted by a first wireless device associated with the apparatus; determine a signal quality metric associated with an impact of a scheduled downlink transmission of the first wireless link with respect to the third wireless device; and adjust the scheduled downlink transmission based at least in part on the second link priority indication having a higher priority than the first link priority indication and the signal quality metric exceeding a signal quality threshold.

29. The apparatus of claim 28, wherein the instructions are further executable by the processor to:
cancel the scheduled downlink transmission.

30. The apparatus of claim 28, wherein the instructions are further executable by the processor to:
transmit the scheduled downlink transmission with a transmission power back off.

31. The apparatus of claim 28, wherein the instructions are further executable by the processor to:
determine the signal quality metric based at least in part on the direct link quality and one or more pilot signals included in the response signal received from the third wireless device.

32. The apparatus of claim 28, wherein the instructions are further executable by the processor to:
establish the first wireless link between the apparatus and the second wireless device as a direct point-to-point wireless link.

33. The apparatus of claim 32, wherein the first wireless link is established prior to transmitting the downlink scheduling information to the second wireless device.

34. The apparatus of claim 28, wherein the instructions are further executable by the processor to:
transmit the downlink scheduling information in a first portion of a frame structure associated with the wireless network.

35. The apparatus of claim 34, wherein the frame structure comprises a second portion for response signals associated with either downlink or uplink response transmissions, and a third portion for data signals associated with either downlink or uplink data transmission.

36. The apparatus of claim 34, wherein the instructions are further executable by the processor to:
transmit uplink scheduling information in the first portion of the frame structure in a frame subsequent to transmitting the downlink scheduling information, the uplink scheduling information including a first clear-to-send message.

37. The apparatus of claim 36, wherein the instructions are further executable by the processor to:
transmit a supplemental response signal associated with the first wireless link, the supplemental response signal including a second clear-to-send message.

38. The apparatus of claim 28, wherein the signal quality metric comprises a signal to interference-plus-noise ratio.

39. The apparatus of claim 28, wherein the apparatus is a primary node in the wireless network and the second wireless device is a secondary node in the wireless network, primary nodes being configured to transmit scheduling information transmissions in the wireless network and secondary nodes being configured to receive scheduling information transmissions in the wireless network.

40. An apparatus for wireless communication, in a system comprising:
a processor;
memory in electronic communication with the processor; and
instructions stored in the memory and operable, when executed by the processor, to cause the apparatus to:
receive first uplink scheduling information from a first wireless device associated with a first wireless link, the first uplink scheduling information including a first link priority indication associated with the first wireless link; receive a response signal from a third wireless device, the response signal being associated with downlink scheduling information of a second wireless link different from the first wireless link and including a second link priority indication associated with the second wireless link; determine a signal quality metric associated with an impact of a scheduled uplink transmission of the first wireless link with respect to the third wireless device, wherein the signal quality metric comprises a signal to interference-plus-noise ratio; and transmit the scheduled uplink transmission with a transmission power back off based at least in part on the second link priority indication having a higher priority than the first link priority indication, and the signal quality metric exceeding a signal quality threshold.

41. The apparatus of claim 40, wherein the instructions are further executable by the processor to:
receive the first uplink scheduling information in a first portion of a frame structure associated with synchronized and slotted wireless communication in a wireless network.

42. The apparatus of claim 41, wherein the frame structure comprises a second portion for clear-to-send signals associated with either downlink or uplink scheduled transmissions, and a third portion for data signals associated with either downlink or uplink data transmission.

43. The apparatus of claim 40, wherein the first wireless device is a primary node in a wireless network and the apparatus is a secondary node in the wireless network, primary nodes being configured to transmit scheduling information transmissions in the wireless network and secondary nodes being configured to receive scheduling information transmissions in the wireless network.

44. An apparatus for wireless communication, in a system comprising:
a processor;
memory in electronic communication with the processor; and
instructions stored in the memory and operable, when executed by the processor, to cause the apparatus to:
receive first downlink scheduling information from a first wireless device in a wireless network, the first wireless device and the second wireless device being associated with a first wireless link; receive second link scheduling information from a third wireless device, the second link scheduling information being associated with downlink scheduling information of a second wireless link different from the first wireless link; determine a signal quality metric associated with a scheduled downlink transmission of the first wireless link, the signal quality metric being determined from reception of the first downlink scheduling information and the second link scheduling information, wherein the signal quality metric comprises a signal to interference-plus-noise ratio; and
transmit a response signal that is orthogonal with respect to the received second link scheduling information and includes a first link priority indication associated with the first wireless link, a transmission of the response signal being based at least in part on a comparison of the signal quality metric to a threshold.

45. The apparatus of claim 44, wherein the response signal is a clear-to-send message.

46. A non-transitory computer readable medium storing code for wireless communication, the code comprising instructions executable by a processor to:
transmit downlink scheduling information to a second wireless device associated with a first wireless link in a wireless network, the downlink scheduling information including a first link priority indication associated with the first wireless link;
receive a response signal from a third wireless device associated with a second wireless link different from the first wireless link, the response signal including a second link priority indication associated with the second wireless link and a direct link quality, a value of the direct link quality being based at least in part on the downlink scheduling information transmitted by the first wireless device;
determine a signal quality metric associated with an impact of a scheduled downlink transmission of the first wireless link with respect to the third wireless device; and
adjust the scheduled downlink transmission based at least in part on the second link priority indication having a higher priority than the first link priority indication and the signal quality metric exceeding a signal quality threshold.

47. The non-transitory computer-readable medium of claim 46, wherein the instructions are further executable by the processor to:
cancel the scheduled downlink transmission.

48. The non-transitory computer-readable medium of claim 46, wherein the instructions are further executable by the processor to:
transmit the scheduled downlink transmission with a transmission power back off.

49. The non-transitory computer-readable medium of claim 46, wherein the instructions are further executable by the processor to:
determine the signal quality metric based at least in part on a direct link quality and one or more pilot signals included in the response signal received from the third wireless device.

50. The non-transitory computer-readable medium of claim 46, wherein the instructions are further executable by the processor to:
establish the first wireless link between the first wireless device and the second wireless device as a direct point-to-point wireless link.

51. A non-transitory computer readable medium storing code for wireless communication, the code comprising instructions executable by a processor to:
receive first uplink scheduling information from a first wireless device associated with a first wireless link, the first uplink scheduling information including a first link priority indication associated with the first wireless link;
receive a response signal from a third wireless device, the response signal being associated with downlink scheduling information of a second wireless link different from the first wireless link and including a second link priority indication associated with the second wireless link;
determine, by the second wireless device, a signal quality metric associated with an impact of a scheduled uplink transmission of the first wireless link with respect to the third wireless device, wherein the signal quality metric comprises a signal to interference-plus-noise ratio; and
transmit, by the second wireless device, the scheduled uplink transmission with a transmission power back off based at least in part on the second link priority indication having a higher priority than the first link priority indication, and the signal quality metric exceeding a signal quality threshold.

52. The non-transitory computer-readable medium of claim 51, wherein the instructions are further executable by the processor to:
receive the first uplink scheduling information in a first portion of a frame structure associated with synchronized and slotted wireless communication in a wireless network.

53. A non-transitory computer readable medium storing code for wireless communication, the code comprising instructions executable by a processor associated with a second wireless device to:
receive first downlink scheduling information from a first wireless device in a wireless network, the first wireless device and the second wireless device being associated with a first wireless link;
receive second link scheduling information from a third wireless device, the second link scheduling information being associated with downlink scheduling information of a second wireless link different from the first wireless link;
determine a signal quality metric associated with a scheduled downlink transmission of the first wireless link, the signal quality metric being determined from reception of the first downlink scheduling information and the second link scheduling information, wherein the signal quality metric comprises a signal to interference-plus-noise ratio; and
transmit a response signal that is orthogonal with respect to the received second link scheduling information and includes a first link priority indication associated with the first wireless link, a transmission of the response signal being based at least in part on a comparison of the signal quality metric to a threshold.

54. The non-transitory computer-readable medium of claim 53, wherein the response signal is a clear-to-send message.

* * * * *